(12) United States Patent
Thomsen

(10) Patent No.: US 12,370,675 B2
(45) Date of Patent: Jul. 29, 2025

(54) METHOD OF OBTAINING VIBRATIONAL PROPERTIES OF ROBOT ARM

(71) Applicant: Universal Robots A/S, Odense S. (DK)

(72) Inventor: Dan Kielsholm Thomsen, Hinnerup (DK)

(73) Assignee: Universal Robots A/S, Odense S. (DK)

( * ) Notice: Subject to any disclaimer, the term of this patent is extended or adjusted under 35 U.S.C. 154(b) by 187 days.

(21) Appl. No.: 17/789,561

(22) PCT Filed: Dec. 18, 2020

(86) PCT No.: PCT/DK2020/050384
§ 371 (c)(1),
(2) Date: Jun. 28, 2022

(87) PCT Pub. No.: WO2021/136565
PCT Pub. Date: Jul. 8, 2021

(65) Prior Publication Data
US 2023/0052996 A1   Feb. 16, 2023

(30) Foreign Application Priority Data
Dec. 29, 2019   (DK) .......................... PA2019 01558

(51) Int. Cl.
*B25J 9/16*   (2006.01)
*B25J 13/08*   (2006.01)
(Continued)

(52) U.S. Cl.
CPC ........... *B25J 9/1602* (2013.01); *B25J 9/1641* (2013.01); *B25J 9/1653* (2013.01); *B25J 13/085* (2013.01);
(Continued)

(58) Field of Classification Search
CPC ...... B25J 9/1602; B25J 9/1641; B25J 9/1653; B25J 13/085; G01L 5/16; G05B 13/0205;
(Continued)

(56) References Cited

U.S. PATENT DOCUMENTS 4,763,531 A    8/1988   Dietrich et al.
5,497,061 A *  3/1996   Nonaka .................. B25J 9/1633
                                                    700/262
(Continued)

FOREIGN PATENT DOCUMENTS

CN   107962567 A      4/2018
CN   112792813 A *    5/2021   ............ B25J 9/1602
(Continued)

OTHER PUBLICATIONS

EP-1920892-B1 translation (Year: 2012).*
(Continued)

*Primary Examiner* — Kyle T Johnson
(74) *Attorney, Agent, or Firm* — ArentFox Schiff LLP

(57) ABSTRACT

A method and robot controller configured to obtain an inertia-vibration model of the robot arm. The inertia-vibration model defines a relationship between the inertia of the robot arm and the vibrational properties of said robot arm and have been by setting the robot arm in a plurality of different physical configurations and for each of said physical configurations of said robot arm obtaining the vibrational properties and the inertia the robot arm. The inertia-vibration model makes it possible to in a simple and efficient way to obtain the vibrational properties of different physical configurations of the robot arm whereby the robot arm can be controlled according to the vibrational properties of the robot arm. This makes it possible to reduce the vibrations of the robot arm during movement of the robot arm.

27 Claims, 18 Drawing Sheets

(51) Int. Cl.
   G01L 5/16      (2020.01)
   G05B 13/02     (2006.01)
   G05B 19/416    (2006.01)

(52) U.S. Cl.
   CPC ............ G01L 5/16 (2013.01); G05B 13/0205 (2013.01); G05B 19/416 (2013.01); G05B 2219/37435 (2013.01); G05B 2219/39186 (2013.01); G05B 2219/40549 (2013.01); G05B 2219/41166 (2013.01); G05B 2219/41231 (2013.01); G05B 2219/49048 (2013.01)

(58) Field of Classification Search
   CPC ........ G05B 19/416; G05B 2219/37435; G05B 2219/39186; G05B 2219/40549; G05B 2219/41166; G05B 2219/41231; G05B 2219/49048
   See application file for complete search history.

(56) References Cited

U.S. PATENT DOCUMENTS

| | | | |
|---|---|---|---|
| 5,638,267 | A | 6/1997 | Singhose et al. |
| 7,181,294 | B2 * | 2/2007 | Nihei .................. F16F 7/1005 703/2 |
| 10,399,232 | B2 | 9/2019 | Oestergaard et al. |
| 10,850,393 | B2 | 12/2020 | Oestergaard et al. |
| 11,260,543 | B2 | 3/2022 | Johansen |
| 11,474,510 | B2 | 10/2022 | Oestergaard et al. |
| 11,796,045 | B2 | 10/2023 | Johansen |
| 11,839,979 | B2 | 12/2023 | Rosenlund et al. |
| 11,964,389 | B2 | 4/2024 | Johansen |
| 12,011,824 | B2 | 6/2024 | Vraa et al. |
| 2013/0079928 | A1 | 3/2013 | Østergaard et al. |
| 2013/0231778 | A1 | 9/2013 | Østergaard |
| 2013/0255426 | A1 | 10/2013 | Kassow et al. |
| 2015/0039128 | A1 | 2/2015 | Oaki |
| 2015/0094736 | A1 * | 4/2015 | Malackowski ........ A61B 17/16 606/130 |
| 2015/0100156 | A1 * | 4/2015 | Jonsson ................. B25J 9/1653 700/245 |
| 2015/0204742 | A1 * | 7/2015 | Draisey ..................... G01L 5/16 73/862.041 |
| 2016/0016310 | A1 | 1/2016 | Zhao et al. |
| 2016/0193731 | A1 * | 7/2016 | Sattler ..................... A61B 34/30 901/9 |
| 2016/0311111 | A1 * | 10/2016 | Ogawara ................ B25J 13/085 |
| 2017/0312922 | A1 * | 11/2017 | Unno ..................... B25J 9/1651 |
| 2018/0281185 | A1 * | 10/2018 | Toshimitsu ............ B25J 9/1697 |
| 2018/0303566 | A1 * | 10/2018 | Soundararajan ....... B25J 9/0009 |
| 2018/0373221 | A1 * | 12/2018 | Nakamura ............ G05B 19/237 |
| 2019/0217468 | A1 | 7/2019 | Ogata |
| 2020/0171658 | A1 * | 6/2020 | Kielsholm Thomsen .................... B25J 9/1664 |
| 2020/0261169 | A1 * | 8/2020 | Miller .................... B25J 9/1607 |
| 2021/0086374 | A1 | 3/2021 | Brandt et al. |
| 2021/0260757 | A1 * | 8/2021 | Nielsen ................. B25J 9/1633 |
| 2021/0260759 | A1 * | 8/2021 | Knudsen ............ G05B 19/4155 |
| 2021/0299871 | A1 * | 9/2021 | Hiraide ................... B25J 9/163 |
| 2022/0105628 | A1 * | 4/2022 | Madsen ............... G05B 19/4155 |
| 2022/0161433 | A1 | 5/2022 | Brandt et al. |
| 2022/0184810 | A1 | 6/2022 | Brandt et al. |
| 2022/0226993 | A1 | 7/2022 | Madsen |
| 2022/0226995 | A1 * | 7/2022 | Beck ....................... B25J 9/1633 |
| 2022/0379463 | A1 | 12/2022 | Hansen |
| 2022/0379468 | A1 | 12/2022 | Hansen |
| 2022/0388156 | A1 | 12/2022 | Hansen |
| 2023/0035296 | A1 | 2/2023 | Søe-Knudsen et al. |
| 2023/0052996 | A1 * | 2/2023 | Thomsen ............... B25J 9/1602 |
| 2023/0191603 | A1 | 6/2023 | Thomsen et al. |
| 2023/0405819 | A1 | 12/2023 | Kravchenko et al. |
| 2023/0405822 | A1 | 12/2023 | Kravchenko et al. |
| 2023/0418258 | A1 | 12/2023 | Mirth |
| 2024/0351209 | A1 | 10/2024 | Graabaek et al. |

FOREIGN PATENT DOCUMENTS

| | | | | |
|---|---|---|---|---|
| DK | 180673 | B1 | 11/2021 | |
| EP | 0444657 | A1 * | 9/1991 | ............ B24B 51/00 |
| EP | 1132790 | A1 | 9/2001 | |
| EP | 1591857 | A2 | 11/2005 | |
| EP | 1920892 | A2 | 5/2008 | |
| EP | 1920892 | B1 * | 12/2012 | ............ B25J 9/1602 |
| EP | 3381625 | A2 | 10/2018 | |
| JP | H08-190402 | A | 7/1996 | |
| JP | 2013-004037 | A | 1/2013 | |
| WO | 92/14195 | A1 | 8/1992 | |
| WO | 2014/110682 | A1 | 7/2014 | |
| WO | WO-2017022310 | A1 * | 2/2017 | ......... A61B 1/00006 |
| WO | 2018/235812 | A1 | 12/2018 | |
| WO | 2019/012040 | A1 | 1/2019 | |
| WO | 2021/136565 | A1 | 7/2021 | |
| WO | 2021/136566 | A1 | 7/2021 | |

OTHER PUBLICATIONS

WO-2017022310-A1 translation (Year: 2017).*
CN-112792813-A translation (Year: 2021).*
Giorgio-et-al-2017-modelling-flexible-multi-link-robots-for-vibration-control.pdf (Year: 2017).*
Biagiotti et al., "Trajectory Planning for Automatic Machines and Robots", Springer-Verlag Berlin Heidelberg, 2008, 515 pages.
Bittencourt et al., "Static Friction in a Robot Joint—Modeling and Identification of Load and Temperature Effects", Journal of Dynamic Systems, Measurement, and Control, vol. 134, No. 5, Sep. 2012, pp. 051013-01-051013-10.
Chang et al., "Time-varying input shaping technique applied to vibration reduction of an industrial robot", Control Engineering Practice, vol. 13, 2005, pp. 121-130.
Kim et al., "Preshaping input trajectories of industrial robots for vibration suppression", Robotics and Computer-Integrated Manufacturing, vol. 54, 2018, pp. 35-44.
Madsen et al., "Model-Based On-line Estimation of Time-Varying Nonlinear Joint Stiffness on an e-Series Universal Robots Manipulator", International Conference on Robotics and Automation (ICRA), 2019, pp. 8408-8414.
Raveendranath et al., "A two-noded locking-free shear flexible curved beam element", International Journal for Numerical Methods in Engineering, vol. 44, No.(2), 1999, pp. 265-280.
Shaw et al., "Periodic responses of a structure with 3: 1 internal resonance", Mechanical Systems and Signal Processing, vol. 81, 2016, pp. 19-34.
Thomsen et al., "Experimental implementation of time-varying input shaping on UR robots", Proceedings of the 16th International Conference on Informatics in Control, Automation and Robotics (ICINCO 2019), vol. 1, 2019, pp. 488-498.
Thomsen et al., "Smooth online time-varying input shaping with fractional delay FIR filtering", Control Engineering Practice, vol. 88, 2019, pp. 21-37.
Tuttle T.D., "Understanding and modeling the behavior of a harmonic drive gear transmission", Tech. rep., Massachusetts Inst of Tech Cambridge Artificial Intelligence Lab, 1992, 315 pages.
Wolf et al., "Extending a dynamic friction model with nonlinear viscous and thermal dependency for a motor and harmonic drive gear", IEEE International Conference on Robotics and Automation (ICRA), 2018, pp. 783-790.
Zhang et al., "Modeling of Torsional Compliance and Hysteresis Behaviors in Harmonic Drives", IEEE/ASME Transactions on Mechatronics, vol. 20, No. (1), 2015, pp. 178-185.
International Preliminary Report on Patentability for International Patent Application No. PCT/DK2020/050385, mailed Jul. 5, 2022, 8 pages.
International Search Report for International Patent Application No. PCT/DK2020/050385, mailed Jul. 8, 2021, 3 pages.
Written Opinion for International Patent Application No. PCT/DK2020/050385, mailed Jul. 8, 2021, 7 pages.
International Preliminary Report on Patentability for International Patent Application No. PCT/DK2020/050384, mailed Jul. 5, 2022, 7 pages.

(56) References Cited

OTHER PUBLICATIONS

International Search Report for International Patent Application No. PCT/DK2020/050384, mailed Jul. 8, 2021, 3 pages.
Written Opinion for International Patent Application No. PCT/DK2020/050384, mailed Jul. 8, 2021, 7 pages.
File History received for European Patent Application No. 20845146.8, mailed on Dec. 20, 2024, 395 pages.
File History received for European Patent Application No. 20845388.6, mailed on Dec. 20, 2024, 323 pages.
Intention to grant received for European Patent Application No. 20845146.8, mailed on Jul. 19, 2024, 8 pages.
Intention to grant received for European Patent Application No. 20845388.6, mailed on Jun. 13, 2024, 9 pages.
Search Report and search opinion received for Danish Patent Application No. PA 201901558, mailed on Jun. 26, 2020, 8 pages.
Search report and search opinion received for Danish Patent Application No. PA 201901559, mailed on Jun. 26, 2020, 8 pages.
Universal Robots., "User Manual UR3/CB3", Version 3.1, Jan. 1, 2009, 181 pages.

* cited by examiner

METHOD OF OBTAINING VIBRATIONAL PROPERTIES OF ROBOT ARM

CROSS-REFERENCE TO RELATED APPLICATIONS

This application is a U.S. national stage entry of PCT Application No. PCT/DK2020/050384, which was filed on Dec. 18, 2020. PCT Application No. PCT/DK2020/050384 claims priority to Denmark Patent Application No. PA201901558, which was filed on Dec. 29, 2019. This application claims priority to PCT Application No. PCT/DK2020/050384 and to Denmark Patent Application No. PA201901558. The contents of PCT/DK2020/050384 and Denmark Patent Application No. PA201901558 are incorporated herein by reference.

FIELD OF THE INVENTION

The present invention relates to methods and robot controllers for controlling a robot arm comprising a plurality of robot joints connecting a robot base and a robot tool flange.

BACKGROUND OF THE INVENTION

Robot arms comprising a plurality of robot joints and links where motors or actuators can move parts of the robot arm in relation to each other are known in the field of robotics. Typically, the robot arm comprises a robot base which serves as a mounting base for the robot arm; and a robot tool flange where to various tools can be attached. A robot controller is configured to control the robot joints in order to move the robot tool flange in relation to the base. For instance, in order to instruct the robot arm to carry out a number of working instructions. The robot joints may be rotational robot joints configured to rotate parts of the robot arm in relation to each other, prismatic joints configured to translate parts of the robot arm in relation to each other and/or any other kind of robot joints configured to move parts of the robot arm in relation to each other.

Typically, the robot controller is configured to control the robot joints based on a dynamic model of the robot arm, where the dynamic model defines a relationship between the forces acting on the robot arm and the resulting accelerations of the robot arm. Often, the dynamic model comprises a kinematic model of the robot arm, knowledge about inertia of the robot arm and other parameters influencing the movements of the robot arm. The kinematic model defines a relationship between the different parts of the robot arm and may comprise information of the robot arm such as, length, size of the joints and links and can for instance be described by Denavit-Hartenberg parameters or like. The dynamic model makes it possible for the controller to determine which torques and/or forces the joint motors or actuators shall provide in order to move the robot joints for instance at specified velocity, acceleration or in order to hold the robot arm in a static posture.

Robot arms need to be programmed by a user or a robot integrator which defines various instructions for the robot arm, such as predefined moving patterns and working instructions such as gripping, waiting, releasing, screwing instructions. The instruction can be based on various sensors or input signals which typically provide a triggering signal used to stop or start at a given instruction. The triggering signals can be provided by various indicators, such as safety curtains, vision systems, position indicators, etc.

Typically, it is possible to attach various end effectors to the robot tool flange or other parts of the robot arm, such as grippers, vacuum grippers, magnetic grippers, screwing machines, welding equipment, dispensing systems, visual systems etc.

A collaborative robot is a robot designed for direct interaction with a human. Light-weight design is one of the main concerns, when a robot is designed to be collaborative. This is to reduce the impact in a potential collision with a human or an obstacle. Thus, the design will be a compromise between low mass and high rigidity. Light-weight design is a major goal in current development of robots, cranes, and automotive industry, just to name a few. A light-weight design is motivated by for example increased performance, increased safety, reduced environmental footprint, reduced energy consumption, and reduced price. A light-weight design will feature an increased amount of mechanical flexibility, compared to the traditional heavy and rigid industrial robots, which are often based on a cast iron design.

Robots with mechanical flexibility pose a challenge in terms of performance. For example, when rapid point-to-point motions are desired, and mechanical vibrations are not acceptable. Therefore, it is desired to suppress mechanical vibrations in robot arms. This can for instance be achieved by utilizing input shaping methods, which slightly modify the target motion of the robot arm, by intelligently adding a time-delay. The modified(shaped) trajectory will reduce the amount of vibrations at the critical natural frequencies of the system.

WO2019012040A1 and corresponding scientific articles {xi.} {xii.} discloses a method for generating inputs to a physical system with varying dynamic properties, which can be used to suppress the mechanical vibrations of a robot arm. The control signals to the robot arm are generated based on the dynamic properties of the physical system which for instance can be obtained based on dynamic modeling of the physical system, lookup tables containing dynamic properties of the physical system, measurements of parts of the physical system, or a combination of the aforementioned. In order to provide an efficient vibration suppression of the robot arm accurate dynamic properties of the robot arm at various poses must be available for the possible poses of the robot arm, where a pose of the robot arm characterizes the position and orientation of the different parts of the robot arm, for instance in form of the positions of the robot joints such as joint angles of the robot joints. This can be achieved by arranging the robot arm in the possible poses and obtain the dynamic properties of the robot arm in a given pose, for instance by performing measurements of the robot arm's damping and eigenfrequencies at the current pose. This is a very complicated process which requires measurement of eigenfrequencies and damping of robot arm at huge number of different configurations of the robot arm, as a typical robot arm can be arrange in nearly infinite amount of poses due to the fine resolution of the robot joints; this is very time consuming. Additionally, the huge number of measured data makes it difficult to evaluate the dynamic properties in real-time.

REFERENCES

{i.} P. H. Chang, H.-S. Park, Time-varying input shaping technique applied to vibration reduction of an industrial robot, Control Engineering Practice 13 (1) (2005) 121-130 http://dx.doi.org/10.1016/j.conengprac.2004.02.009

{ii.} T. D. Tuttle, Understanding and modeling the behavior of a harmonic drive gear transmission, Tech. rep., Massachusetts Inst of Tech Cambridge Artificial Intelligence Lab (1992)

{iii.} H. Zhang, S. Ahmad, G. Liu, Modeling of torsional compliance and hysteresis behaviors in harmonic drives, IEEE/ASME Transactions on Mechatronics 20 (1) (2015) 178-185 http://dx.doi.org/10.1109/TMECH.2014.2311382

{iv.} J. Kim, E. A. Croft, Preshaping input trajectories of industrial robots for vibration suppression, Robotics and Computer-Integrated Manufacturing 54 (2018) 35-44. http://dx.doi.org/10.1016/j.rcim.2018.05.009

{v.} E. Madsen, O. S. Rosenlund, D. Brandt, X. Zhang, Model-based on-line estimation of time-varying nonlinear joint stiffness on an e-series universal robots manipulator, in: 2019 International Conference on Robotics and Automation (ICRA), 2019, pp. 8408-8414, http://dx.doi.org/10.1109/ICRA.2019.8793935

{vi.} P. Raveendranath, G. Singh, B. Pradhan, A two-noded locking-free shear flexible curved beam element, International Journal for Numerical Methods in Engineering 44 (2) (1999) 265-280, http://dx.doi.org/10.1002/(SICI)1097-0207(19990120)44:2<265::AID-NME505>3.0.CO;2-K {vii.} A. Shaw, T. Hill, S. Neild, M. Friswell, Periodic responses of a structure with 3:1 internal resonance, Mechanical Systems and Signal Processing 81 (2016) 19-34; http://dx.doi.org/10.1016/j.ymssp.2016.03.008

{viii.} S. Wolf, M. Iskandar, Extending a dynamic friction model with nonlinear viscous and thermal dependency for a motor and harmonic drive gear, in: 2018 IEEE International Conference on Robotics and Automation (ICRA), 2018, pp. 783-790; http://dx.doi.org/10.1109/ICRA.2018.8460613

{ix.} A. C. Bittencourt, S. Gunnarsson, Static Friction in a Robot Joint—Modeling and Identification of Load and Temperature Effects, Journal of Dynamic Systems, Measurement, and Control 134 (5), 051013; http://dx.doi.org/10.1115/1.4006589

{x.} L. Biagiotti, C. Melchiorri, Trajectory Planning for Automatic Machines and Robots, Springer-Verlag Berlin Heidelberg, 2008. http://dx.doi.org/10.1007/978-3-540-85629-0

{xi.} D. K. Thomsen, R. Søe-Knudsen, D. Brandt, X. Zhang, Experimental implementation of time-varying input shaping on ur robots, in: Proceedings of the 16th International Conference on Informatics in Control, Automation and Robotics (ICINCO 2019), Vol.~1, 2019, pp. 488-498; http://dx.doi.org/10.5220/0007834504880498

{xii.} D. K. Thomsen, R. Søe-Knudsen, D. Brandt, O. Balling, X. Zhang, Smooth online time-varying input shaping with fractional delay {FIR} filtering, Control Engineering Practice 88 (2019) 21-37; http://dx.doi.org/10.1016/j.conengprac.2019.04.003

SUMMARY OF THE INVENTION

The object of the present invention is to address the above described limitations with the prior art or other problems of the prior art. This is achieved by the method and robot controller according to the independent claims where an inertia-vibration model of the robot arm can be obtained. The inertia-vibration model defines a relationship between the inertia of the robot arm and the vibrational properties of the robot arm and can be obtained based on an inertia-vibration model of the robot arm, where the inertia-vibration model of the robot arm has been obtained by setting the robot arm in a plurality of different physical configurations and for each of the physical configurations of said robot arm obtaining the vibrational properties and the inertia of the robot arm. The inertia-vibration model makes it possible to in a simple and efficient way to obtain the vibrational properties of different physical configurations of the robot arm whereby the robot arm can be controlled according to the vibrational properties of the robot arm. This makes it possible to reduce the vibrations of the robot arm during movement of the robot arm, for instance by utilizing input shaping methods. Additionally, the above described limitations with the prior art or other problems of the prior art are addressed by a method and robot arm according to the independent claims where the robot arm is controlled based on control signals generated based on a target motion for the robot arm and the vibrational properties of the robot arm; where vibrational properties of the robot arm are obtained based on an inertia-vibration model relating to the robot arm, wherein the inertia-vibrational properties model defines a relationship between the inertia of the robot arm and the vibrational properties of said robot arm. Controlling a robot arm based on an inertia-vibration model of the robot arm makes it possible to reduce the vibrations of the robot arm. Additionally, the method and robot controller according to the present invention makes it possible to obtain the vibrational properties of a robot arm where to external objects, such as wires, hoses, end effectors and/or the mounting element whereon the robot arm have been mounted, have been connected, as the inertia-vibration model can be obtained based on the robot arm with these external objects connected to the robot arm. Consequently, the vibrations caused by connecting external objects of the robot arm can also be reduced. The dependent claims describe possible embodiments of the robot arm and methods according to the present invention. The advantages and benefits of the present invention are described in further detail in the detailed description of the invention.

DETAILED DESCRIPTION OF THE INVENTION

The present invention is described in view of exemplary embodiments only intended to illustrate the principles of the present invention. The skilled person will be able to provide several embodiments within the scope of the claims. Throughout the description, the reference numbers of similar elements providing similar effects have the same last two digits. Further it is to be understood that in the case that an embodiment comprises a plurality of the same features then only some of the features may be labeled by a reference number.

Figure 1:
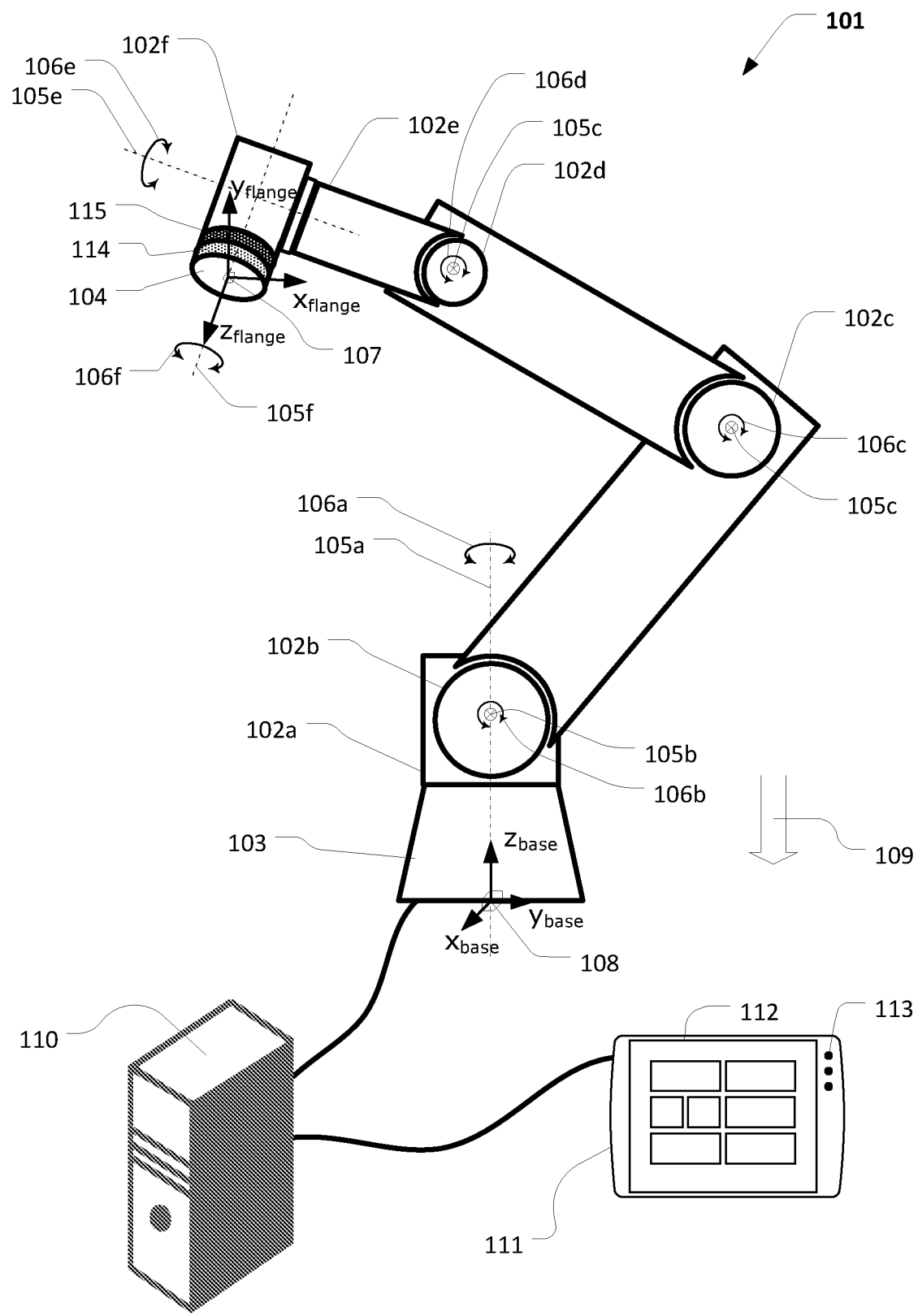
FIG. 1 illustrates a robot arm according to the present invention.

FIG. 1 illustrates a robot arm 101 comprising a plurality of robot joints 102a, 102b, 102c, 102d, 102e, 102f connecting a robot base 103 and a robot tool flange 104. A base joint 102a is configured to rotate the robot arm around a base axis 105a (illustrated by a dashed dotted line) as illustrated by rotation arrow 106a; a shoulder joint 102b is configured to rotate the robot arm around a shoulder axis 105b (illustrated as a cross indicating the axis) as illustrated by rotation arrow 106b; an elbow joint 102c is configured to rotate the robot arm around an elbow axis 105c (illustrated as a cross indicating the axis) as illustrated by rotation arrow 106c; a first wrist joint 102d is configured to rotate the robot arm around a first wrist axis 105d (illustrated as a cross indicating the axis) as illustrated by rotation arrow 106d and a second wrist joint 102e is configured to rotate the robot arm around a second wrist axis 105e (illustrated by a dashed dotted line) as illustrated by rotation arrow 106e. Robot joint 102f is a robot tool joint comprising the robot tool flange 104, which is rotatable around a tool axis 105f (illustrated by a dashed dotted line) as illustrated by rotation arrow 106f. The illustrated robot arm is thus a six-axis robot arm with six degrees of freedom with six rotational robot joints, however it is noticed that the present invention can be provided in robot arms comprising less or more robot joints and also other types of robot joints such as prismatic robot joints providing a translation of parts of the robot arm for instance a linear translation.

A robot tool flange reference point 107 also known as a TCP (Tool Center Point) is indicated at the robot tool flange and defines the origin of a tool flange coordinate system defining three coordinate axes $x_{flange}$, $y_{flange}$, $z_{flange}$. In the illustrated embodiment the origin of the robot tool flange coordinate system has been arranged on the tool flange axis 105f with one axis ($z_{flange}$) parallel with the tool flange axis and with the other axes $x_{flange}$, $y_{flange}$ parallel with the outer surface of the robot tool flange 104. Further a base reference point 108 is coincident with the origin of a robot base coordinate system defining three coordinate axes $x_{base}$, $y_{base}$, $z_{base}$. In the illustrated embodiment the origin of the robot base coordinate system has been arranged on the base axis 105a with one axis ($z_{base}$) parallel with the base axis 105a axis and with the other axes $x_{base}$, $y_{base}$ parallel with at the bottom surface of the robot base. The direction of gravity 109 in relation to the robot arm is also indicated by an arrow and it is to be understood that the at robot arm can be arranged at any position and orientation in relation to gravity.

The robot arm comprises at least one robot controller 110 configured to control the robot arm 101 and can be provided as a computer comprising an interface device 111 enabling a user to control and program the robot arm. The controller can be provided as an external device as illustrated in FIG. 1 or as a device integrated into the robot arm or as a combination thereof. The interface device can for instance be provided as a teach pendent as known from the field of industrial robots which can communicate with the controller via wired or wireless communication protocols. The interface device can for instanced comprise a display 112 and a number of input devices 113 such as buttons, sliders, touchpads, joysticks, track balls, gesture recognition devices, keyboards, microphones etc. The display may be provided as a touch screen acting both as display and input device. The interface device can also be provided as an external device configured to communicate with the robot controller, for instance in form of smart phones, tablets, PCs, laptops etc. The interface device can be a teach pendent, a handle or a smartphone communicating wired or wireless with the robot controller.

The robot tool flange 104 comprises a force-torque sensor 114 integrated into the robot tool flange 104. The force-torque sensor 114 provides a tool flange force signal indicating a force-torque provided at the robot tool flange. In the illustrated embodiment the force-torque sensor is integrated into the robot tool flange and is configured to indicate the forces and torques applied to the robot tool flange in relation to the tool robot tool flange reference point 107. The force-torque sensor 114 provides a force and torque signal indicating a force and torque provided at the tool flange. In the illustrated embodiment the force-torque sensor is integrated into the robot tool flange and is configured to indicate the forces applied to the robot tool flange in relation to the reference point 107 and in the tool flange coordinate system. However, the force-torque sensor can indicate the force-torque applied to the robot tool flange in relation to any point which can be linked to the robot tool flange coordinate system. In one embodiment the force-torque sensor is provided as a six-axis force-torque sensor configured to indicate the forces along and the torques around three perpendicular axes. The force-torque sensor can for instance be provided as any force-torque sensor capable of indicating the forces and torques in relation to a reference point for instance any of the force torque sensors disclosed by WO2014/110682A1, U.S. Pat. No. 4,763,531, US2015204742. However, it is to be understood that the force sensor in relation to the present invention not necessarily need to be capable of sensing the torque applied to the tool flange. It is noted that the force-torque sensor may be provided as an external device arranged at the robot tool flange, at other parts of the robot arm or be omitted.

An acceleration sensor 115 is arranged at the robot tool joint 102f and is configured to sense the acceleration of the robot tool joint 102f and/or the acceleration of the robot tool flange 104. The acceleration sensor 115 provides an acceleration signal indicating the acceleration of the robot tool joint 102f and/or the acceleration of the robot tool flange 104. In the illustrated embodiment the acceleration sensor is integrated into the robot tool joint and is configured to indicate accelerations of the robot tool joint in the robot tool coordinate system. However, the acceleration sensor can indicate the acceleration of the robot tool joint in relation to any point which can be linked to the robot tool flange coordinate system. The acceleration sensor can be provided as any accelerometer capable of indicating the accelerations of an object. The acceleration sensor can for instance be provided as an IMU (Inertial Measurement Unit) capable of indicating both linear acceleration and rotational accelerations of an object. It is noted that the acceleration sensor may be provided as an external device arranged at the robot tool flange, at other parts of the robot arm or omitted.

Each of the robot joints comprises a robot joint body and an output flange rotatable or translatable in relation to the robot joint body and the output flange is connected to a neighbor robot joint either directly or via an arm section as known in the art. The robot joint comprises a joint motor configured to rotate or translate the output flange in relation to the robot joint body, for instance via a gearing or directly connected to the motor shaft. The robot joint body can for instance be formed as a joint housing and the joint motor can be arranged inside the joint housing and the output flange can extend out of the joint housing. Additionally, the robot joint comprises at least one joint sensor providing a sensor signal indicative of at least one of the following parameters: an angular and/or linear position of the output flange, an angular and/or linear position of the motor shaft of the joint motor, a motor current of the joint motor or an external force and/or torque trying to rotate the output flange or motor shaft. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. It is noted that both output encoders indicating the angular position of the output flange and input encoders indicating the angular position of the motor shaft can be provided, which in embodiments where a gearing have been provided makes it possible to determine a relationship between the input and output side of the gearing. The joint sensor can also be provided as a current sensor indicating the current through the joint motor and thus be used to obtain the torque provided by the motor. For instance, in connection with a multiphase motor, a plurality of current sensors can be provided in order to obtain the current through each of the phases of the multiphase motor. It is also noted that some of the robot joints may comprise a plurality of output flanges rotatable and/or translatable by joint actuators, for instance one of the robot joints may comprise a first output flange rotating/translating a first part of the robot arm in relation to the robot joint and a second output flange rotating/translating a second part of the robot arm in relation to the robot joint. As indicated above, the joint sensor can also be provided as a force-torque sensor or an acceleration sensor. Such force and/or torque and acceleration sensor may be part of the outmost joint as indicated on FIG. 1, however the other parts of the robot arm may also comprise force-torque sensors or acceleration sensors. The robot controller is configured to control the motions of the parts of the robot arm and the robot joints by controlling the motor torque provided to the joint motors based on a dynamic model of the robot arm, the direction of gravity acting and the joint sensor signal.

Figure 2:
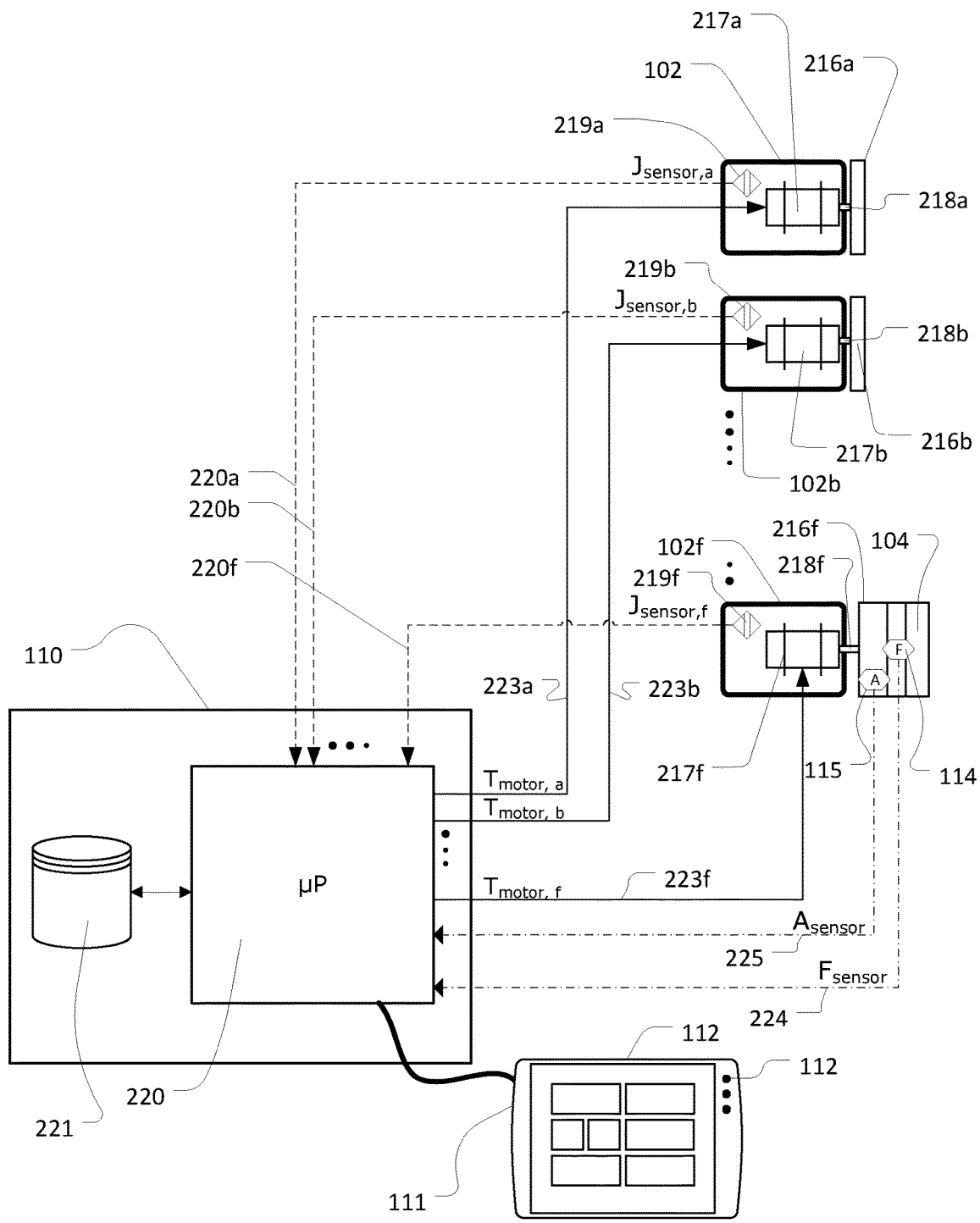
FIG. 2 illustrates a simplified structural diagram of the robot arm.

FIG. 2 illustrates a simplified structural diagram of the robot arm illustrated in FIG. 1. The robot joints 102a, 102b and 102f have been illustrated in structural form and the robot joints 102c, 102d, 102e and the robot links connecting the robot joints have been omitted for the sake of simplicity of the drawing. Further the robot joints are illustrated as separate elements however it is to be understood that they are interconnected either directly or via a robot link as illustrated in FIG. 1. The robot joints comprise an output flange 216a, 216b, 216f and a joint motor 217a, 217b, 217f or another kind of actuator, where the output flange 216a, 216b, 216f is rotatable in relation to the robot joint body. The joint motors 217a, 217b, 217f are respectively configured to rotate the output flanges 216a, 216b, 216f via an output axle 218a, 218b, 218f. It is to be understood that the joint motor or joint actuator may be configured to rotate the output flange via a transmission system such as a gear (not shown). In this embodiment the output flange 216f of the tool joint 123f constitutes the tool flange 104. At least one joint sensor 219a, 219b, 219f providing a sensor signal 220a, 220b, 220f indicative of at least one joint sensor parameter $J_{sensor,a}$, $J_{sensor,b}$, $J_{sensor,f}$ of the respective joint. The joint sensor parameter can for instance indicate a pose parameter indicating the position and orientation of the output flange in relation to the robot joint body, an angular position of the output flange, an angular position of a shaft of the joint motor, a motor current of the joint motor. The joint sensor parameter is selected from the list comprising: speed, acceleration, torque, motor torque, force and position. The joint sensor parameters can be measures obtained from sensors or values derived from such sensor values. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. The motor currents can be obtained and indicated by current sensors.

The robot controller 110 comprises a processer 221 and memory 222 and is configured to control the joint motors of the robot joints by providing motor control signals 223a, 223b, 223f to the joint motors. The motor control signals 223a, 223b, 223f are indicative of the motor torque $T_{motor,a}$, $T_{motor,b}$, and $T_{motor,f}$ that each joint motor shall provide to the output flanges and the robot controller is configured to determine the motor torque based on a dynamic model of the robot arm as known in the prior art. The dynamic model makes it possible for the controller to calculate which torque the joint motors shall provide to each of the joint motors to make the robot arm perform a desired movement. The dynamic model of the robot arm can be stored in the memory 222 and be adjusted based on the joint sensor parameters $J_{sensor,a}$, $J_{sensor,b}$, $J_{sensor,f}$. For instance, the joint motors can be provided as multiphase electromotors and the robot controller can be configured to adjust the motor torque provided by the joint motors by regulating the current through the phases of the multiphase motors as known in the art of motor regulation.

Robot tool joint 102f comprises the force-torque sensor 114 providing a tool flange force-torque signal 224 indicating a force-torque $FT_{flange}$ provided to the tool flange. For instance, the force signal-torque $FT_{flange}$ can be indicated as a force vector $\overrightarrow{F_{sensor}^{flange}}$ and torque vector $\overrightarrow{T_{sensor}^{flange}}$ in the robot tool flange coordinate system:

$$\overrightarrow{F_{sensor}^{flange}} = \begin{pmatrix} F_{x,sensor}^{flange} \\ F_{y,sensor}^{flange} \\ F_{z,sensor}^{flange} \end{pmatrix} \quad \text{eq. 1}$$

where $F_{x,sensor}^{flange}$ is the indicated force along the $x_{flange}$ axis, $F_{y,sensor}^{flange}$ is the indicated force along the $y_{flange}$ axis and $F_{z,sensor}^{flange}$ is the indicated force along the $z_{flange}$ axis.

In an embodiment where the force sensor is provided as a combined force-torque sensor the force-torque sensor can additionally also provide a torque signal indicating the torque provide to the tool flange, for instance as a separate signal (not illustrated) or as a part of the force signal. The torque can be indicated as a torque vector in the robot tool flange coordinate system:

$$\overrightarrow{T_{sensor}^{flange}} = \begin{pmatrix} T_{x,sensor}^{flange} \\ T_{y,sensor}^{flange} \\ T_{z,sensor}^{flange} \end{pmatrix} \quad \text{eq. 2}$$

where $T_{x,sensor}^{flange}$ is the indicated torque around the $x_{flange}$ axis, $T_{y,sensor}^{flange}$ is the indicated torque around the $y_{flange}$ axis and $T_{z,sensor}^{flange}$ is the indicated torque around the $z_{flange}$ axis. It is noted that the force vector and torque vector can be provided as separate signals and that a separate force sensor and/or torque sensor can be provided.

Robot tool joint 102f may comprise the acceleration sensor 115 providing an acceleration signal 225 indicating the acceleration of the robot tool flange where the acceleration may be indicated in relation to the tool flange coordinate system $$\overrightarrow{\psi_{sensor}^{flange}} = \begin{pmatrix} \psi_{x,sensor}^{flange} \\ \psi_{y,sensor}^{flange} \\ \psi_{z,sensor}^{flange} \end{pmatrix} \quad \text{eq. 3}$$

where $\psi_{x,sensor}^{flange}$ is the sensed acceleration along the $\psi_{y,sensor}^{flange}$ is the axis sensed acceleration along the $y_{flange}$ axis and $\psi_{z,sensor}^{flange}$ is the sense acceleration along the $z_{flange}$ axis. Also or alternatively, the acceleration sensor can be configured to measure the acceleration of the robot tool flange in relation to gravity and the acceleration measured acceleration in relation to gravity can be converted into accelerations in relation to the robot tool flange of robot base.

In an embodiment where the acceleration sensor is provided as a combined accelerometer/gyrometer (e.g. an IMU) the acceleration sensor can additionally or alternatively provide an angular acceleration signal indicating the angular acceleration of the output flange in relation to the robot tool flange coordinate system, for instance as a separate signal (not illustrated) or as a part of the acceleration signal. The angular acceleration signal can indicate an angular acceleration vector $\overrightarrow{a_{sensor}^{flange}}$ in the robot tool flange coordinate system $$\overrightarrow{\alpha_{sensor}^{flange}} = \begin{pmatrix} \alpha_{x,sensor}^{flange} \\ \alpha_{y,sensor}^{flange} \\ \alpha_{z,sensor}^{flange} \end{pmatrix} \quad \text{eq. 4}$$

where $a_{x,sensor}^{flange}$ is the angular acceleration around the $x_{flange}$ axis, $a_{y,sensor}^{flange}$ is the angular acceleration around the $y_{flange}$ axis and $a_{z,sensor}^{flange}$ is the angular acceleration around the $z_{flange}$ axis. Also or alternatively, the acceleration sensor can be configured to measure the angular acceleration of the robot tool flange in relation to gravity and the angular acceleration measured in relation to gravity can be converted into angular accelerations in relation to the robot tool flange of robot base.

Figure 3:
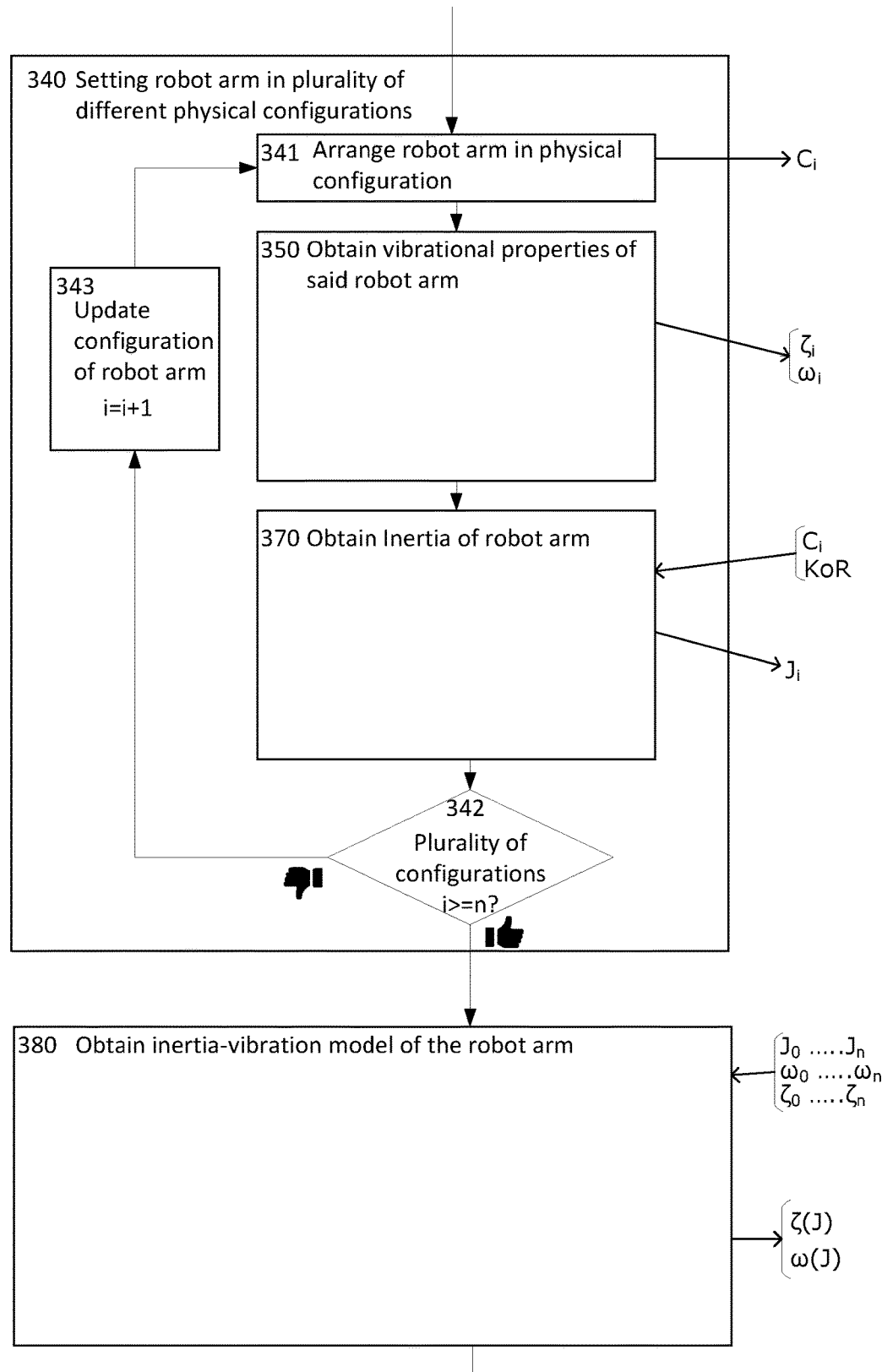
FIG. 3 illustrates a flow diagram of a method of obtaining the vibrational properties of a robot arm.

The force sensor and acceleration sensor of the illustrated are arranged at the robot tool joint 102f; however, it is to be understood that the force sensor and acceleration sensor can be arrange at any part of the robot arm FIG. 3 illustrates a flow diagram of a method of obtaining the vibrational properties of a robot arm, like the robot arm 101 described previously. The method comprises a step 340 of setting the robot arm in a plurality of different physical configurations ($C_i \ldots C_n$). The method comprises for each of the different physical configurations of the robot arm step 350 of obtaining the vibrational properties of the robot arm in relation to at least one robot joint and a step 370 of obtaining the inertia of the robot arm in relation to the at least one robot joint. In the illustrated embodiment step 340 of setting the robot arm in a plurality of different physical configurations comprises a step 341 of arranging the robot arm in a physical configuration $C_i$, where after in step 350 the vibrational properties of the robot arm are obtained and in step 370 the inertia of the robot arms is obtained. Step 342 is a step of evaluating if the robot arm has been arranged in a plurality of different configurations and where for each physical configuration the vibrational properties and the inertia of the robot arm have been obtained. For instance, step 342 can test if a counter i have reached a desired threshold value n indicating the number of different physical configurations the robot arm shall be arranged in. If the test fails indicated by a thumb down icon the method proceeds to step 334 of updating the physical configuration of the robot arm and arranging the robot arm in a new physical configuration in step 341. If the different number of different physical configuration have been achieved as indicated by thumb up icon the method proceeds to step 380 of obtaining an inertia-vibration model of the robot arm.

A physical configuration of the robot arm characterizes the physical properties of the robot arm and different physical configurations are characterized in that the robot arm's physical appearance have been changed. For instance, the different physical configurations can be obtained by changing the pose of the robot arm or by changing other physical properties of the robot arm. The pose of the robot arm characterizes the position and orientation of the different parts of the robot arm, for instance in form of the positions of the robot joints such as joint angles of the robot joints. The pose of the robot arm can thus be changed by moving one of the robot joints such that at least two parts of the robot arm are displaced in relation to each other. Further the pose of the robot arm can be changed by changing the orientation of the robot arm in relation to gravity for instance by mounting the robot base differently in relation to gravity. Further different configurations can be provided by changing physical properties of the robot arm by removing/adding a mass (payload) to a part of the robot arm by attaching various objects to the robot tool flange. Different physical configurations of the robot arm can also be provided by changing different parts of the robot arm, for instance changing length/weight of robot links.

The vibrational properties of the robot arm in relation to at least one robot joint characterizes the dynamic response of the robot arm in response to forces/torques applied to the robot arm. Typically, such dynamic response is in form of mechanical vibrations of parts of the robot arm and the vibrational properties of the robot arm in relation to at least one robot joint can thus characterize how a part of the robot arm will move in response to an applied force. For instance, the vibrational properties can be obtained as a step response where a short impulse in form of a force/torque is applied to the robot arm and where movements of a part of the robot arm in response to the applied impulse are observed. Also, the vibrational properties can be obtained by applying a known sequence/pattern of force/torques to the robot arm and observe the movements of the part of the robot arm in response to the applied sequence. The vibrational properties can for instance be indicated as frequency spectrum analysis of the acceleration of a part of the robot arm, mode shapes characterizing deformation of a part of the robot arm, parameters indicating eigenfrequencies and damping of the robot arm and transfer function indicating how a part of the robot arm dynamically behave in response to an applied force/torque. In the illustrated embodiment the vibration parameters at the robot arm in physical configuration $C_i$ is indicated as the eigenfrequency $\omega_i$ and the damping $\zeta_i$ of the robot arm.

The inertia $J_i$ of the robot arm in relation to the at least one robot joint characterizes the robot arm's resistance to change in velocity in relation to the at least one robot joint. The inertia of the robot arm can be obtained based on the physical configuration $C_i$ of the robot arm and a kinematic model KoR of the robot arm. For instance, the inertia of the robot arm may be obtained based on the pose of the robot arm and the kinematic model of the robot arm, KoR, where the pose of the robot arm is used as an input to the kinematic model of the robot arm. In situations where the different physical configuration of the robot arm has been provided by the changing physical properties of the robot arm, the kinematic model of the robot arm needs to be change accordantly.

The method comprises step 380 of obtaining an inertia-vibration model based on the vibration properties $\omega_1 \ldots \omega_n$, $\zeta_1 \ldots \zeta_n$ and the inertia $J_i \ldots J_n$ of the robot arm obtained for the plurality of different physical configurations of the robot arm. The inertia-vibration model defines a relationship between the inertia of the robot arm and the vibrational properties of the robot arm. Obtaining an inertia-vibration model of the robot arm makes it possible to obtain the vibrational properties of the robot arm based on the inertia of the robot arm, which makes it possible to control the robot arm based on the vibrational properties. For instance, the robot arm can be controlled using input shaping as described in the background of the invention, where the impulses used to shape the input signal are generated based on the vibrational properties obtained based on the inertia-vibration model. It is thus possible to obtain the vibrational properties of the robot arm in a given physical configuration in a fast an simple way, as this can be performed based on the inertia-vibration model of the robot arm and the inertia of the robot arm can easily be obtained based on the kinematic model of the robot arm and the actual pose of the robot arm. As will be discussed in the later paragraphs, the inventor has showed that a relationship between the inertia of the robot arm and the vibrational properties can be established by obtaining the vibrating properties and corresponding inertia for a plurality of different configurations of the robot arm. Consequently, the vibrational properties of the robot arm in a given configuration can be obtained based on the inertia of the robot arm in the given configuration using the inertia-vibration model.

Additionally, the inertia-vibration model of the robot arm can be obtained when the robot arm has been installed in the robot installation. Consequently, the influence of external objects connected to the robot arm on the vibrational properties of the robot arm will be included in the obtained inertia-vibration model. The external objects can be any objects connected to the robot arm such as wires, hoses, end effectors and/or the mounting element whereon the robot arm have been mounted.

The inertia-vibration model may be embodied as a look-up table comprising a number of lookup points, where each lookup point comprises the inertia of the robot arm and corresponding vibrational properties of the robot arm. In connection with control of a robot arm the controller can for instance be adapted to identify the data set which has an inertia which is closest to the actual inertia of the robot arm and then control the robot arm based on the vibrational properties relating to that data set. Alternatively, the vibrational properties can be obtained as an interpolation between a plurality of data points of the inertia-vibration model, where the interpolation are obtained based on the inertia of the robot arm and the inertia of the plurality of data points.

The inertia-model may also be provided as an inertia-vibration function where the inputs to the function are the inertia of the robot arm where the output of the function is the vibrational properties of the robot arm. The inertia-vibration function can be derived based on the number of obtained inertia and vibration properties of the different physical configurations of the robot arm. For instance, the inertia-vibration function may be provided as a second order function. In the illustrated embodiment the inertia-vibration model is in step 380 provided as an eigenfrequency function $\omega(J)$ and the damping function $\zeta(J)$ respectively providing the eigenfrequency $\omega$ and damping $\zeta$ of the robot arm as a function of the robot arm's inertia J. However, it is to be understood that inertia-vibration function can be provided as any function characterizing the vibrations of the robot arm as a function of the inertia of the robot arm.

Figure 4:
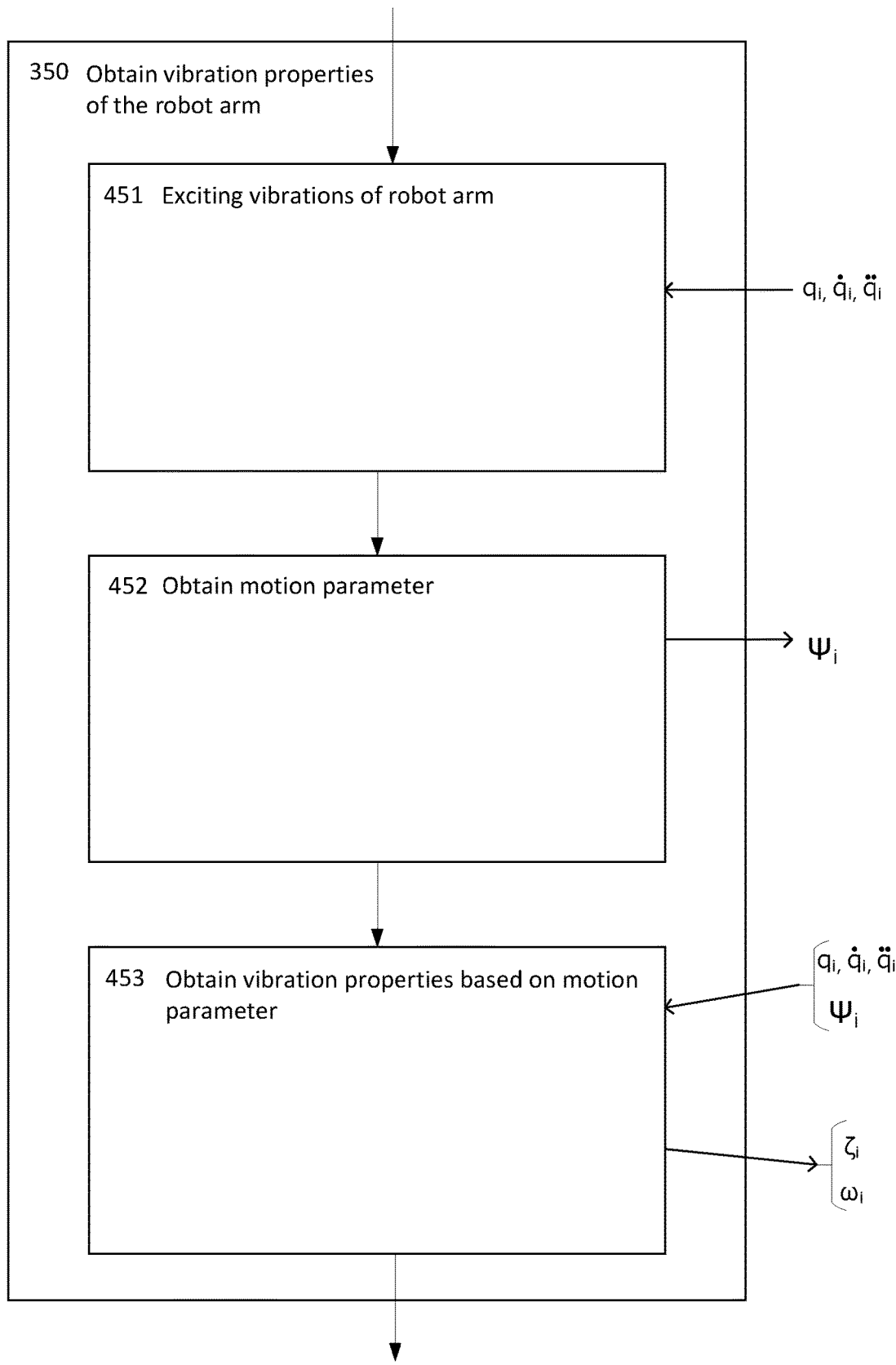
FIG. 4 illustrates a flow diagram of a step of obtaining the vibrational properties of the robot arm in a physical configuration.

FIG. 4 illustrates an embodiment of step 350 of obtaining the vibrational properties of the robot arm. Step 350 is performed when the robot arm has been arranged in a physical configuration and comprises a step 451 of exciting vibrations of the robot arm, a step 452 of obtaining at least one motion parameter of the robot arm and step 453 of obtaining the vibrational properties of the robot arm.

Step 451 of exciting vibrations of the robot arm can be performed by applying a force or torque to the robot arm causing the robot arm to vibrate accordantly. The force or torque can for instance be applied using an external source for instance by hitting, pushing, pulling, vibrating the robot arm using an external force/torque generator. For instance, an external vibrating motor may be connected to the robot arm and configured to introduce the external force/torque. In one embodiment the force/torque is applied by activating the joint motor of one of the robot joints, hereby a force or torque is provided to the robot arm and the dynamics of the robot arm are excited. For instance, the joint motor can be activated by instructing a joint motor to move the corresponding output flange to position q, to move the output flange with speed $\dot{q}$, to accelerate the output flange with acceleration $\ddot{q}$, such movement will result in that the joint motor moves a part of the robot arm according to the instructed movement parameters q, $\dot{q}$, $\ddot{q}$. For instance, in a robot arm as described and illustrated in FIGS. 1 and 2, the instructed movement parameters q, $\dot{q}$, $\ddot{q}$ can be provided to the joint motor as a motor signal 223a, 223b, 223c indicating a desired motor torque $T_{motor,a}$, $T_{motor,b}$, $T_{motor,f}$ that will result in the instructed movement parameters. Also, the desired motor torque can be used as inputs to the step of exciting vibration of the robot arm.

The joint motor can for instance be activated according to a predetermined activation function and/or sequence where the joint motor is activated according to a predetermined pattern. For instance, the joint motor may be instructed to perform movements around it's current position whereby vibrations is introduced at the robot joint and the robot arm can be considered kept in the same physical configuration. The vibrations can for instance be excited by a number of impulses, back and forth movements, random movements etc. The impulses can for instance instruct the joint motor to move instantaneously in different directions, back and forth movements can for instance be performed as trigonometric functions/circular functions such sine and cosine functions. In one embodiment sine/cosine functions can be performed as a frequency sweep where the frequency of the sine/cosine function changes over time, hereby it is possible to obtain the vibrational properties of the robot arm as a function of the introduced frequency. The vibrations of the robot arm can hereby be excited in relation to a first axis, where the first axis is defined by the motor axle of the joint motor.

In one embodiment the first robot joint constitutes the robot joint closest to the robot base. This is beneficial as the robot joint closed to the robot base introduce the most dominant vibrations to the robot arm, consequently obtaining the inertia-vibration model based on the robot joint closest to the robot base ensures that dominant vibrational properties are incorporated into the inertia-vibration mode.

Step 452 of obtaining at least one motion parameter of the robot arm is performed upon exciting vibrations of the robot arm in step 451, meaning that step 452 is performed when the vibrations is being and/or has been introduced to the robot arm, whereby motion parameter of a part of the robot arm can be obtained. In other words, step 452 of obtaining the motion parameter can be initiated when step 451 of exciting the vibrations of the robot arm starts and thus performed simultaneously with step 451. Further the step of obtaining the motion parameters can be continued after the step 451 have ended as this makes it possible to obtain the motion parameters after the excitement of the robot arm have ended which for instance makes it possible to obtain damping properties of the robot arm.

The obtained motion parameters can be any parameter characterizing the motion of a part of the robot arm or any parameter from which motion parameters can be obtained, for instance position, speed and/or acceleration of the part of the robot arm. The part of the robot arm of which the motion parameters are obtained can be any part of the robot arm of which the vibration properties of the robot arm are to be obtained. Typically, the part of the robot arm constitutes the part of the robot arm of which the vibrations shall be reduced using impulse shaping, for instance in one embodiment the part of the robot arm constitutes the robot tool flange as this is often the part that is desired to reduce the vibrations of. However, it is to be understood the it can be any part of the robot arm.

The motion parameter can be obtained by using any sensor(s) capable of providing the motion parameter of the part of the robot arm, for instance the sensor(s) can be in form of building sensors provided at the robot arm, such as joint encoders capable of proving encoder signals indicating the angles of the robots joints, accelerometers sensing acceleration of a part of the robot. Also, the motion sensors can be external sensors such as cameras, 3D trackers or any other device capable of sensing motion of a part of the robot arm. For instance, in a robot arm as described and illustrated in FIGS. 1 and 2 the motion parameters can be provided using the accelerometer 115 arrange at the robot tool joint 102f and the motion parameter can thus be provided as the acceleration $A_i$ of the robot tool joint.

The step 453 of obtaining the vibrational properties of the robot arm in relation to the at least one robot joint based on the activation of the joint motor and the at least one motion parameter can be achieved by establishing a transfer function describing how the motions introduced by activation of the robot joint motor transfers into motions of the part of the robot arm of which the motion parameter is obtained. The vibrational properties of the robot arm can then be extracted from the transfer function. In an ideally rigid robot arm motions introduced by a robot joint motor will be transferred immediately into motions of the robot arm and motion parameters at any part of the robot arm can be calculated based on the knowledge such at the kinematic of the physical configurations of the arm. However, due to flexibility of robot joints and robot links the motions will not be transferred instantaneously through the robot arm and also cause deviations for the ideally ridged robot arm. The transfer function can for instance describe these deviations and be used to extract the vibrational properties of the robot arm.

Figure 10:
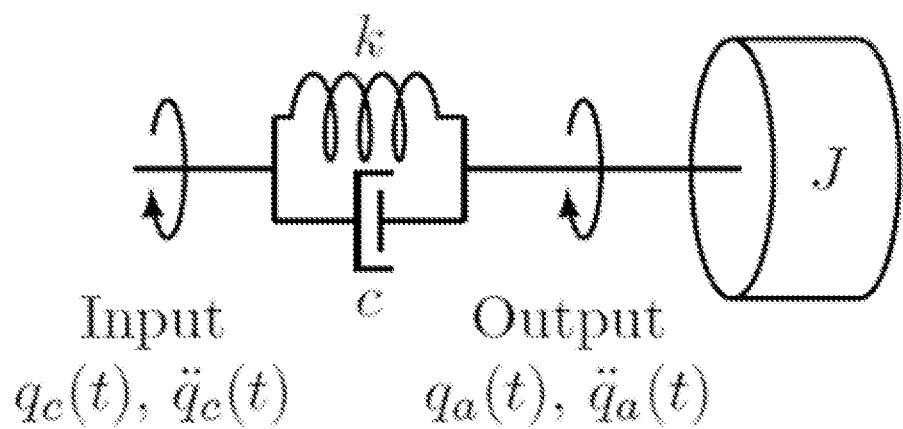
FIG. 10 illustrates a second order rotational spring, mass, damper system used to model a robot arm.

In one embodiment the inertia-vibrational model is a $2^{nd}$ order transfer function. A $2^{nd}$ order transfer function provides a good estimate of the vibrational properties of the robot arm as a function of the robot arm's inertia as the robot arm can be modeled as a spring and damper system (as illustrated in FIG. 10), which has second order vibrational properties.

In one embodiment the vibrational properties of the robot arm can be obtained in relation to a first robot joint and in relation to a second robot joint and where the corresponding inertia of the robot arm are obtained in relation to the first joint and/or in relation to the second joint. This can for instance be achieved by repeating step 451 of exciting vibrations of the robot arm, step 452 of obtaining the motion parameters of the robot arm, step 453 of obtaining the vibrational properties for each of the first and second robot joint. This makes it possible to obtain the inertia-vibration model based on the obtained vibrational properties of the robot arm in relation to the first robot joint, the obtained vibrational properties of the robot arm in relation to the second robot joint, the obtained inertia of the robot arm in relation to the first robot joint and the obtained inertia of the robot arm in relation to the second robot joint. Consequently, a more robust and accurate inertia-vibration model can be provided, as the inertia-vibration model can be obtained based on changes of the inertia of the robot arm caused by changes of both the first and second robot joint. Thus, the inertia-vibration model can be used to obtain the vibrational properties of the robot arm in relation to the first and second robot joint whereby the inertia-vibration model covers a broader range of inertia of the robot arm and thereby the vibration properties of the robot arm can be estimated over a broader range of robot configurations using the inertia-vibration model.

In one embodiment, the vibrational properties of the robot arm can be obtained in relation to an axis of movement of the first robot joint and the inertia of the robot arm can likewise be obtained in relation to the axis of movement of the first robot joint. Similarly, the vibrational properties of the robot arm can be obtained in relation to an axis of movement of the second robot joint and the inertia of the robot arm can be obtained in relation to the axis of movement of the second robot joint. This makes it possible to obtain the inertia-vibrational model based on the vibrational properties and inertia in relation to the axis of movements of the first and second robot joints. In a typical robot arm changes in relation to the axis of movement of the first and second robot joint as numbered from the robot base results in a large change in inertia of the entire robot as such changes results in a larger reconfiguration of the mass of the robot arm. Thus, in one embodiment the first robot joint and the second robot joint constitutes the two robot joints closest to the robot base. However, it is to be understood that the first and second joint can refer to any of the robot joints of the robot arm. Further it is also possible to obtain the vibrational properties and corresponding inertia in relation to more than two robot joints and thereafter provide the inertia-vibrational robot based on the vibrational properties and corresponding inertia of the robot arm in relation to more than two robot joints.

In one embodiment, the axis of movement of the first robot joint and the axis of movement of the second axis of the second robot joint are non-parallel in relation to each other. This ensures that changes of the first and second robot joint manipulates the robot arm differently whereby the vibrational properties can be obtained for a larger variety of physical configurations of the robot arm. For instance, the axis of movement of the first robot joint and the axis of movement of the second axis of the second robot joint are perpendicular in relation to each other.

Figure 5:
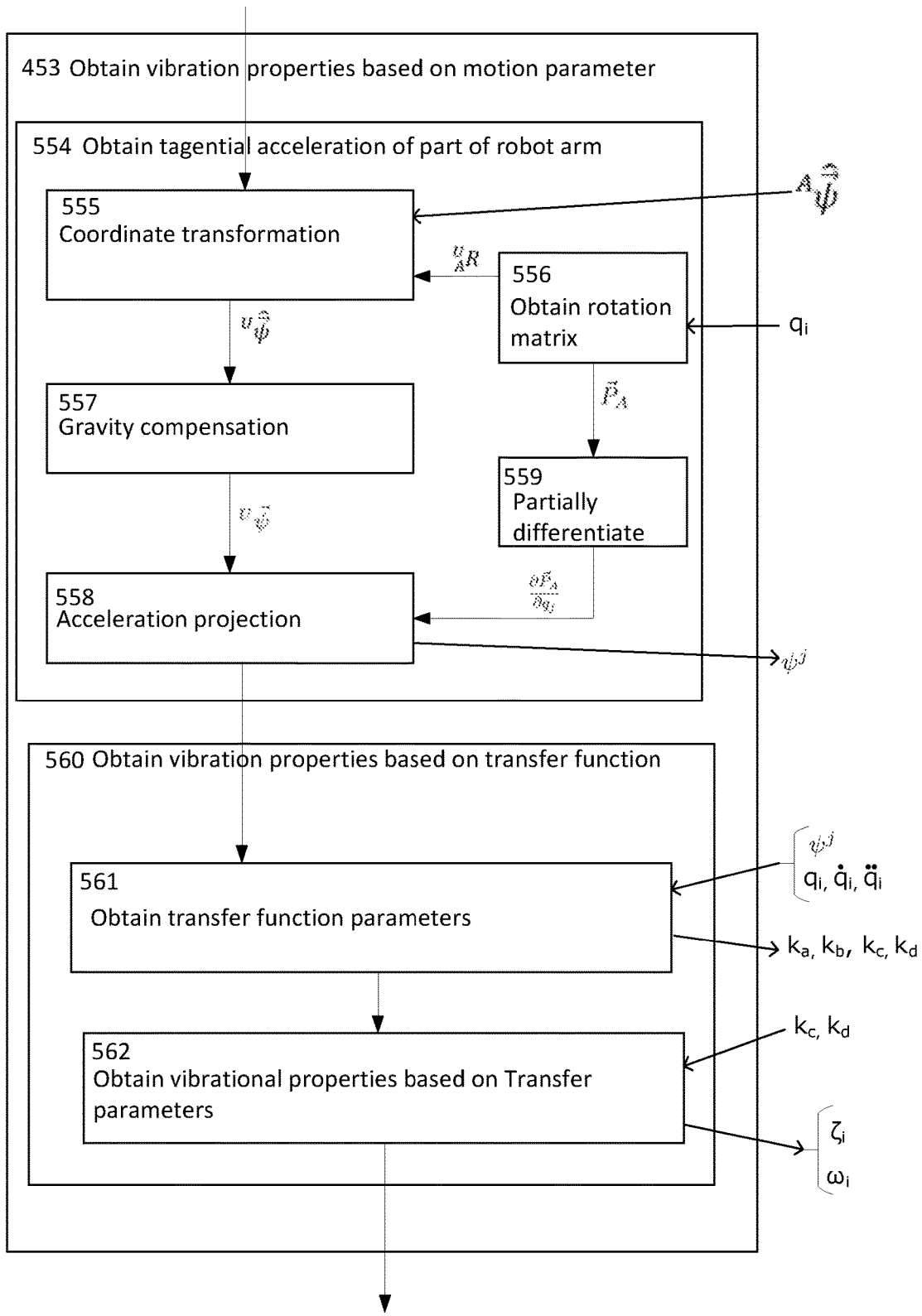
FIG. 5 illustrates a flow diagram of a step of obtaining the vibrational properties of the robot arm based on motion parameters.

As discussed in the background of the invention a successful implementation of input shaping of a robot arm depends on a reliable estimate of the natural frequencies and damping ratios of the robot arm. In the following paragraphs [0045]-[0087] a detailed description and an example of a method for obtaining an inertia-vibration model of the robot arm is described. The outcome is an inertia-vibration model of the robot arm of $\omega_n$ and $\zeta$ for two observed vibration modes in the robot arm. FIG. 5 illustrates the step of obtaining the vibrational properties of the robot arm in a physical configuration. The method comprises the step 554 of obtaining tangential acceleration of the part of the robot arm and a step 561 of obtain a transfer function for the part of the robot arm 560.

Observed Vibration Modes

Complicated vibration modes are expected, when examining the structure of a robot arm like the robot arm illustrated in FIG. 1 in an arbitrary configuration. The complicated dynamic system with continuously distributed mass, flexibility, and damping will be subject to a multitude of different vibration modes in all directions. However, it can be assumed that mechanical flexibility can be approximated as rotational flexibility in the robot joints, such that robot link flexibility is concatenated into the robot joint flexibility, resulting in an equivalent torsional stiffness. Attention should be drawn to the robot joints, that are closest to the robot base of the robot arm.

There are three reasons, that the robot joints near the robot base have a large impact on the dynamic behavior of the robot arm: First an angular deflection near the robot base will result in large displacement of the robot tool flange, whereas an angular deflection in the one of the wrist joints of the robot arm will only result in minor tool displacement, 2) The robot joints near the robot base experience higher inertia, and thereby lower natural frequencies; and 3) The robot joints near the robot base experience higher load torques.

Based on these observations, it is expected that a robot arm like the robot arm illustrated in FIG. 1 will have its most dominant vibration modes as rotational modes around the base joint 102*a* and shoulder robot joint 102*b*. In one embodiment, the vibrations around the elbow joint 102*c* can also be considered as an individual vibration mode. However, in robot arms where the axes of the shoulder joint and elbow joint are parallel it can be expected that the flexibility of the parallel robot joints can also be seen included in one equivalent torsional stiffness.

Consequently, it is assumed that vibrations of the robot arm can be approximated by two vibration modes: 1) Around the base joint, and 2) around the shoulder joint.

It is known, that a typical industrial robot arm with 6 degrees of freedom (DOF) has configuration-dependent dynamic behavior. In other words, the robot arm is a complicated non-linear dynamic system, but it can be approximated as a linear dynamic system in a specific configuration.

In a 6DOF robot arm, there are multiple contributions to the configuration-dependent behavior. Contributions include variations in payload, mass distribution, and control parameters, non-linear stiffness of gears and load-dependent friction, etc. Among these factors, it is expected, that mass distribution (system inertia) has the largest impact on configuration dependency of natural frequencies and damping. Chang and Park showed a near linear relationship between natural frequency around the base joint and horizontal distance to payload {i.}. According to an embodiment of the present invention the robot arm will be treated as a more nuanced configuration-dependent dynamic system will multiple physical time-varying behaviors taken into account.

Obtaining Vibrational Properties of Robot Arm

There are multiple ways to estimate the dynamics of a system, such as the vibrational properties of a robot arm. For system dynamics estimation, it is possible to use models, tables, measurements or a combination of aforementioned. Examples of different modeling approaches to dynamics estimation are: finite element methods, symbolic Lagrangian methods, lumped parameter methods, transfer matrix methods, and assumed mode methods. In this embodiment the vibrational properties of the robot arm are obtained by using an accelerometer arranged at the robot tool joint, for instance a built-in accelerometer in the tool flange. Further data from the target motion of the robot tool flange and sensor data, such as accelerometer readings are used to obtain the dynamic properties. Such data parameters are typically available from Real-Time Data Exchange interface of the robot arm. More specific in this embodiment the vibrational properties of the robot arm can be obtained based on target joint position $\dot{q}_J(t)$, the target robot joint acceleration $\ddot{q}_J(t)$ and accelerometer readings $^A\vec{\psi}(t)$ Gravity and Orientation Compensation In an embodiment where the accelerometer measures the acceleration in a local accelerometer frame A, some post processing of the accelerometer measurements is needed before they can be used in for obtaining the vibrational properties of the robot arm. Consequently, in step 554 the tangential acceleration of a part of the robot arm is obtained based on the obtained acceleration of the part of the robot arm. Here it is desired to obtain an acceleration signal, that is expressed in the universal coordinate frame and without gravity. This can be obtained in step 555 by transforming the 3×1 raw accelerometer measurements $\vec{\psi}$ from the local accelerometer frame A to the global (universal) frame, U, as shown in eq. 5, where $^A\vec{\psi}$ is the accelerations represented in the local frame A of the accelerometer, $^U\vec{\psi}$ is the accelerations in global frame U and $_A{}^U R$ is the rotation matrix of frame A obtained in step 556 as known in the art:

$$^U\vec{\psi} = {}_A{}^U R \, {}^A\vec{\psi} \qquad \text{eq. 5}$$

$$^U\vec{\psi} = {}^U\vec{\psi} - (0\ 0\ g)^T \qquad \text{eq. 6}$$

Figure 6:
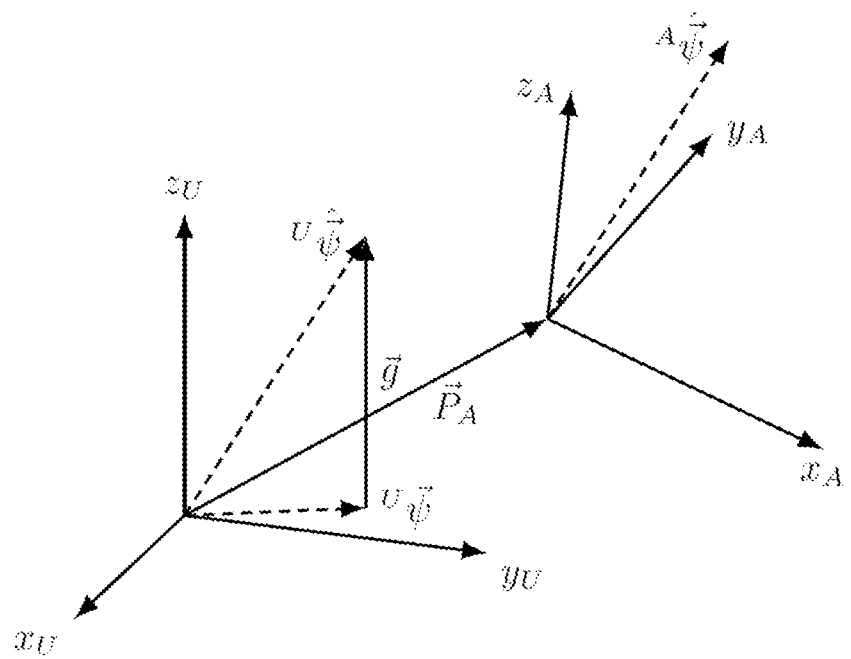
FIG. 6 illustrates a coordinate transformation between a universal coordinate frame and an accelerometer frame.

Then gravity compensation is performed in step 557 and can be performed as in eq. 6 where $^U\vec{\psi}$ is the gravity compensated accelerations in the global frame U and g is the acceleration of gravity ~9.82 m/s². The coordinate transformation and gravity compensation are illustrated in FIG. 6, where the three coordinate axes of the accelerometer frame are illustrated as $x_A$, $y_A$, $z_A$ and the obtained accelerations in the accelerometer frame is illustrated as vector $^A\vec{\psi}$. The three coordinate axes of the universal coordinate frame are illustrated as $x_u$, $y_u$, $z_u$ and the obtained accelerations in the universal coordinate frame is illustrated as vector $^U\vec{\psi}$. Vector $\vec{P}_A$ indicates the position of the accelerometer frame in relation to the universal coordinate frame and vector $\vec{g}$ illustrates gravity in the universal coordinate frame. In connection with a robot arm the origin of the accelerometer frame can for instance correspond to the robot tool flange reference point 107 (TCP) and the origin of the universal coordinate frame can correspond to the base reference point 108 as illustrated in FIG. 1.

Looking at Tangential Acceleration

The acceleration component $\psi^j$ which describes the measured acceleration in the direction of interest, i.e. in the robot joint motion direction is performed in step 558 of projecting the acceleration into the direction of interest. When a robot joint accelerates, this results in an acceleration of the robot tool flange. This acceleration will be tangential to the resulting circular motion of the robot tool flange. Here, this acceleration is called the tangential acceleration, $\psi^j$. If only one robot joint is moving, and mechanical flexibility is neglected, there is a linear relation between angular acceleration in the robot joint $\ddot{q}_J$ and tangential acceleration of the robot tool flange $\psi^j$. This makes $\psi^j$ an interesting measure, because it allows for a lot of simplification, when estimating the vibrational properties of the robot arm. Also, any contributions from centrifugal or Coriolis accelerations can be disregarded by looking at the tangential acceleration instead of the magnitude of acceleration. This is advantageous. as centrifugal and Coriolis accelerations is a result of robot joint velocity $\dot{q}_J$ and not robot joint acceleration, $\ddot{q}_J$.

The tangential acceleration $\psi^j$ can be obtained based on the tangential direction of the acceleration. This direction is the partial derivative obtained in step 559 of the position of the accelerometer with respect to robot joint position $$\frac{\partial \vec{P}_A}{\partial q_j},$$

which is also the $j^{th}$ column of the 6×6 Jacobian matrix and can be approximated simply by infinitesimal motions as:

$$\delta_i = \begin{cases} 1e^{-3} & \text{for } i = j \\ 0 & \text{otherwise} \end{cases} \qquad \text{eq. 7}$$

$$\frac{\partial \vec{P}_A}{\partial q_j} \approx \frac{\vec{P}_A(\vec{q} + \vec{\delta}) + \vec{P}_A(\vec{q} - \vec{\delta})}{2|\vec{\delta}|} \qquad \text{eq. 8}$$

where $\vec{\delta}$ is a 6×1 vector used to add a small change in robot joint angle in robot joint j, $\vec{P}_A$ is the position of the accelerometer computed by forward kinematics based on the robot joint angles $\vec{q}$. Then the tangential acceleration can be determined as the scalar projection of $^U\vec{\psi}$ onto $$\frac{\partial \vec{P}_A}{\partial q_j}:$$

$$\psi^j = \frac{^U\vec{\psi} \cdot \frac{\partial \vec{P}_A}{\partial q_j}}{\left|\frac{\partial \vec{P}_A}{\partial q_j}\right|} \qquad \text{eq. 9}$$

Figure 7:
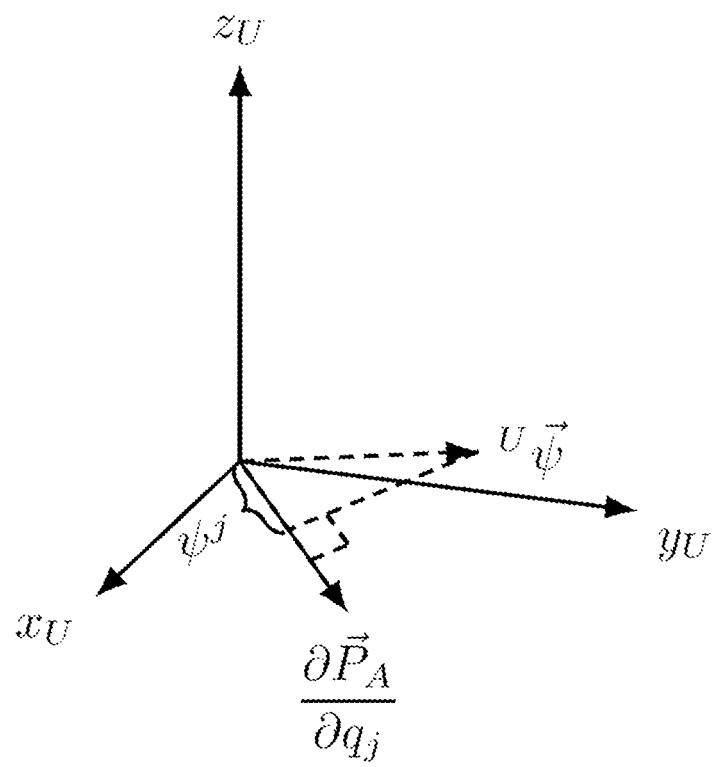
FIG. 7 illustrates a scalar projection of acceleration to obtain tangential acceleration.

Thereby, the tangential acceleration has been obtained by pre-processing the raw accelerometer readings based on the robot joint angles. The scalar projection to obtain $\psi^j$ is illustration in FIG. 7.

Fitting to a Transfer Function

Step 560 is a step of obtaining the vibrational properties of the robot arm based on a transfer function characterizing movements of a part of the robot arm as a result of the excitation of the robot arm. For instance, the transfer function can be established based on the considerations in the following paragraphs [0056]-[0063].

Figure 8:
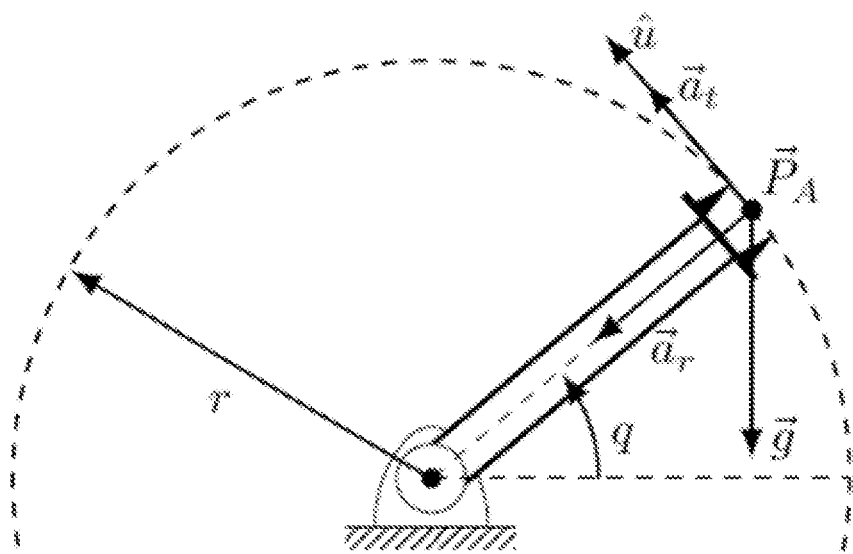
FIG. 8 illustrates tangential and radial acceleration for circular motion of a point of a ridged robot arm.

The robot arm can be thought of as a single link manipulator, when moving only one joint. Without loss of generalization, the accelerometer position $\vec{P}_A$, will move on a circular arc, when moving only one joint, like illustrated in FIG. 8. Thus, the acceleration has a tangential component $\vec{a}_t$ and a radial component $\vec{a}_r$ and gravitational component $\vec{g}$:

$$\vec{a}_r = r \cdot \dot{q}^2 \vec{P}_A \qquad \text{eq. 10}$$

$$\vec{a}_t = \psi = r\ddot{q}\hat{u} \qquad \text{eq. 11}$$

$$\vec{g} = (0\ 0\ g)^T \qquad \text{eq. 12}$$

where q is joint angle, r is accelerometer radius, ψ is the tangential acceleration, g is acceleration of gravity ~9.82 m/s² and û is a unit vector in the tangential direction:

$$\hat{u} = \frac{\frac{\partial \vec{P}_A}{\partial q}}{\left|\frac{\partial \vec{P}_A}{\partial q}\right|} \qquad \text{eq. 13}$$

It is thereby seen, that radial component emerges from joint velocity $\dot{q}$ and the tangential component is directly related to the joint acceleration $\ddot{q}$. The total acceleration measured by the accelerometer in the global coordinate frame will be:

$$\vec{\psi} = \vec{a}_r + \vec{a}_t + \vec{g} \qquad \text{eq. 14}$$

The tangential acceleration can then be isolated as:

$$\psi^j = \left(\vec{\psi} - \vec{g}\right) \cdot \hat{u} \qquad \text{eq. 15}$$

$$= \underbrace{\vec{a}_r \hat{u}}_{0} + \underbrace{\vec{a}_t \hat{u}}_{r\ddot{q}} + = r\ddot{q} \qquad \text{eq. 16}$$

as seen from eq. 16, there will be a linear relationship between actual joint acceleration $\ddot{q}_a$ and the tangential acceleration of the accelerometer $\psi^j$ when assuming flexible joints and rigid links. Thus $\psi^j$ is the acceleration component of interest, and therefore, it is extracted from the accelerometer measurements.

Figure 9:
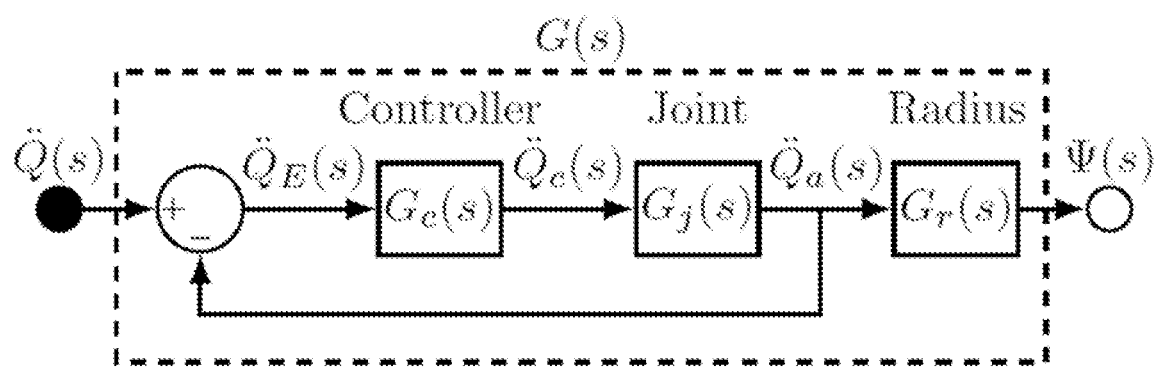
FIG. 9 illustrates closed loop dynamics of controlled acceleration of a point of a robot arm.

It is assumed, that the local dynamics can be described by a transfer function $G(s) = \Psi(s)/\ddot{Q}(s)$ as illustrated in the block diagram in FIG. 9, where $\ddot{Q}(s)$ is the reference (target) joint acceleration in the Laplace domain, $\ddot{Q}_a(s)$ the actual joint acceleration, $\ddot{Q}_E(s)$ the error in joint acceleration, $\ddot{Q}_C(s)$ is the control acceleration, $\Psi(s)$ is the actual acceleration of the part of the robot arm, $G_c(s)$ is the controller transfer function, and $G_j(s)$ is the joint (mechanical) transfer function, and $G_r(s)$ is a rigid body transformation from angular acceleration to tangential acceleration.

Here it is assumed, that the mechanical joint dynamics in a local configuration can be approximated by a second order system, like the spring, mass, damper system illustrated in FIG. 10 where k is spring stiffness, c is damping coefficient, J is mass moment of inertia, $q_c(t)$ is the control joint angle, and $q_a$ actual joint angle.

It is possible to establish the dynamic equation for such a spring, mass, damper system as:

$$J\ddot{q}_a(t) = k\delta q(t) + c\dot{\delta q}(t) \qquad \text{eq. 17}$$

where δq(t) is the joint gear deformation:

$$\delta q(t) = q_c(t) - q_a(t) \qquad \text{eq. 18}$$

Figure 11:
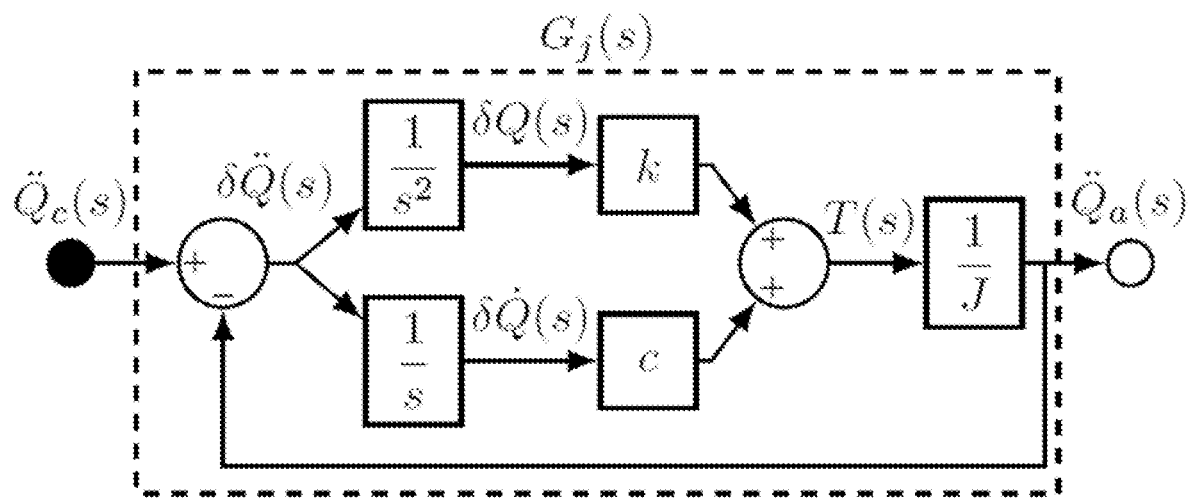
FIG. 11 illustrates a block diagram of robot joint dynamics.

The dynamic equation in eq. 17 can be presented in block diagram form, as illustrated in FIG. 11, where $\ddot{Q}_c(s)$ is the Laplace transform of $q_c(t)$ and T(s) is the resulting torque, acting on the inertia J.

The illustrated block diagram of FIG. 11 can be reduced by block diagram transformation methods to the joint transfer function $G_j(s)$:

$$G_{jointj}(s) = \frac{\ddot{G}_a(s)}{\ddot{G}_c(s)} = \frac{\frac{k}{J} + \frac{c}{J}s}{s^2 + \frac{c}{J}s + \frac{k}{J}}, \qquad \text{eq. 19}$$

which is a second order transfer function with two poles and one zero, because the denominator has two roots of s and the numerator has one root of s.

The transfer function $G_r(s)$ describes the relationship between actual joint acceleration $\ddot{Q}_a(s)$, and the tangential acceleration Ψ(s) by a simple scaling, as seen from eq. 11:

$$G_{radr}(s) = \frac{\psi(s)}{\ddot{Q}_a(s)} = r \qquad \text{eq. 20}$$

where r is the radius from the joint axis to the accelerometer location.

It can be assumed that the controller is a type of PID controller. However, this increases the order of the closed loop dynamic system. It is consistently sought to keep the system as a 2nd order system, in order to provide the best basis for input shaping, and to keep the formulation as simple as possible to keep it understandable and to avoid overparameterization during the optimization procedures. Thus, it is assumed that the governing dynamics of the controller can be estimated by a proportional controller, i.e. P control, which does not impact the order of the closed loop system. Should this approximation be too uncertain, then no good fit will be found. If a good fit can be found, then the approximation is OK. Then the controller transfer function of a P controller simply becomes:

$$G_c(s) = K_p \qquad \text{eq. 21}$$

where $K_p$ is the proportional gain of the controller.

The closed loop transfer function G(s) of the system illustrated in FIG. 9 can be combined as $$G(s) = \frac{\psi(s)}{\ddot{Q}(s)} \qquad \text{eq. 22}$$

$$= \frac{G_C(s)G_j(s)}{1 + G_c(s)G_j(s)} G_r(s) \qquad \text{eq. 23}$$

$$= \frac{rK_p\left(\frac{k}{J} + \frac{c}{J}s\right)}{s^2 + \underbrace{(1+K_p)\frac{c}{J}}_{2\zeta\omega_n}s + \underbrace{(1+K_p)\frac{k}{J}}_{\omega_n^2}} \qquad \text{eq. 24}$$

It is a goal to approximate the local dynamics as second order time-invariant, because the input shaping formulation is based on second order dynamic systems. Thereby, even if a better approximation can be obtained by a higher order system, then a second order approximation will provide the best foundation for the shaping filter to function. It is seen, that that closed loop transfer function G(s) is also a second order system with two poles and one zero. Hence for dynamics identification in a local configuration, the transfer function can be described by four coefficients as:

$$G_{local}(s) = \frac{k_a + k_b s}{s^2 + \underbrace{k_c s}_{2\zeta\omega_n} + \underbrace{k_d}_{\omega_n^2}},$$ eq. 25 where $k_a$, $k_b$, $k_c$ and $k_d$ are coefficients subject to optimization.

Typically input shaping methods relies on information about the system dynamic response in the form of natural frequency $\omega_n$ and damping ratio $\zeta$. These parameters can be obtained from the transfer function G(s). The vibrational properties is governed by the denominator of the transfer function, and can be obtained by comparing to the characteristic second order transfer function, H(s):

$$H(s) = \frac{\omega_n^2}{s^2 + 2\zeta\omega_n s + \omega_n^2}$$ eq. 26

The local natural frequency and damping can be determined by comparing $G_{local}(s)$ in eq. 25 to H(s) in eq. 26, such that:

$$\omega_n = \sqrt{k_d}$$ eq. 27

$$\zeta = \frac{k_c}{2\sqrt{k_d}}$$ eq. 28

Step 560 of obtaining the vibration properties of the robot comprises a step 561 of obtaining the transfer function parameters of $G_{local}(s)$ which are suitable for the robot in the specific physical configuration. The optimization problem of optimizing $G_{local}(s)$ in eq. 25 can be solved with the objective to minimize the model prediction error norm of the model, i.e. $|\psi_{predicted}^j - \psi_{measured}^j|$. This can be obtained by most known optimization algorithms. For instance, the calculation and simulation program MATLAB provides a simple function, named tfest, for fitting the system parameters of $G_{local}(s)$ to the measured time-domain data of $\ddot{q}_j$ and $\psi^j(t)$. tfest utilize the weighted prediction error norm as cost function and a non-linear least squares search method for the optimization.

In step 562 the vibrational properties can be obtained based on transfer function parameters obtained in eq. 27 and eq. 28.

To summarize the step 453 of obtaining vibrational properties illustrated in FIG. 5 illustrates how to obtain the vibrational properties in form of the eigenfrequency $\omega_n$,j and the damping $\zeta_j$ of the physical configuration of the robot arm based on the motion parameters in form of raw accelerometer measurement, and the target joint angles $\vec{q}$ and the target joint accelerations $\ddot{\vec{q}}$ used to excite the robot arm.

Step 380 of obtaining the inertia-vibration model of the robot arm based on obtained vibrational parameters can be performed based on the considerations presented in the following paragraphs [0068]-[0078].

Once the vibrational properties of the robot arm have been obtained for a number of different physical configurations of the robot arm it will be possible to identify some description of the relationship between physical configurations of the robot arm and the vibrational properties of the robot arm.

This can be done by choosing some generalized coordinates and making a data fit to some parametric description, e.g. a general polynomial function like a straight line in {i.}. However, it is desired to derive a parametric description, which makes physical sense in accordance with the understanding of the dynamic system. Thus, the natural frequency and damping are derived from G(s). By comparing the closed loop system transfer function, G(s), in eq. 24 to the characteristic transfer function H(s) a similarity in eq. 26 structure should be noticed. Based on the similarities, the damping ratio $\zeta$ and the natural frequency $\omega_n$ can be obtained. The natural frequency can readily be found as:

$$\omega_n = \sqrt{1+K_p}\sqrt{k/J}$$ eq. 29

Similarly, the damping ratio can be found from:

$$2\zeta\omega_n = (1+K_p)\frac{c}{J}$$ eq. 30 and by combining eq. 29 and eq. 30 and isolating $\zeta$:

$$\zeta = \frac{c\sqrt{1+K_p}}{2\sqrt{kJ}}$$ eq. 31

It is realized from eq. 29 and eq. 31 that $\omega_n$ and $\zeta$ are varying with the mass moment of inertia J. The mass moment of inertia experienced on each joint axis in a local configuration can be determined by standard procedures for forward kinematics and inertia transformations from joint angles.

It can be seen, that the vibrational properties of the robot arm can be estimated based on mass moments of inertia of the robot arm, and the mass moments of inertia can be obtained based on the robot joint angles.

Figure 12:
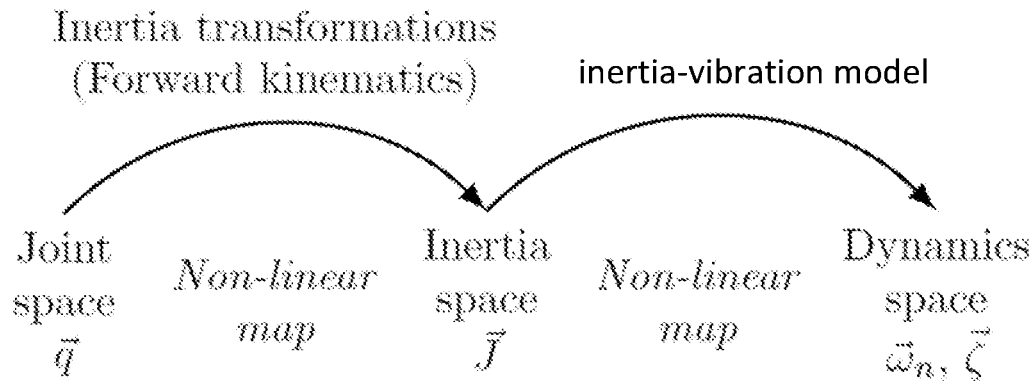
FIG. 12 illustrates mapping from robot joint space to vibrational space via the inertia space.

FIG. 12. illustrates how the physical configuration of the robot arm in joint space $\vec{q}$ are converted into inertia space $\vec{J}$ using inertia transformations also known as forward kinematics of the robot arm. The obtained inertia $\vec{J}$ is then used to estimate the vibrational properties $\vec{\omega_n}$, $\vec{\zeta}$ of the robot arm in the dynamic space using the inertia-vibration model.

In addition, three other contributions to physical configuration depended vibrational properties are expected; 1) a gear stiffening effect, 2) a configuration damping friction coefficient, and 3) a controller gain adaption.

Figure 13:
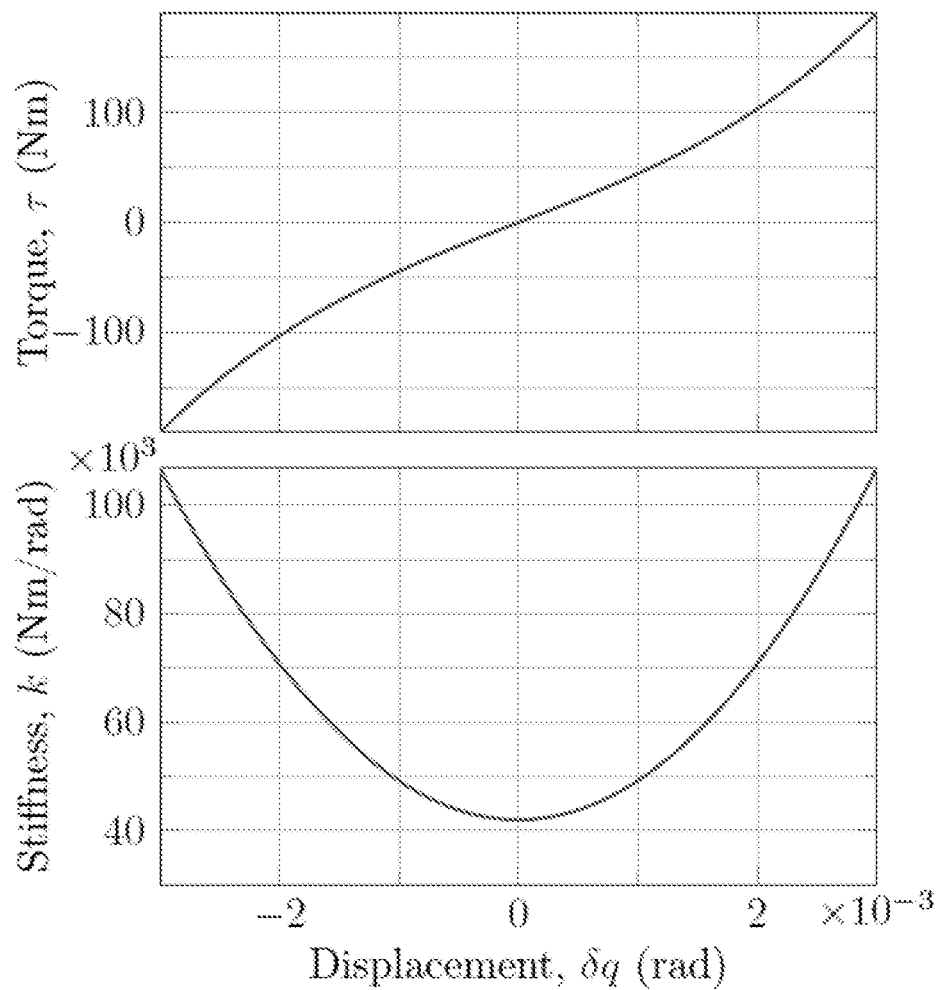
FIG. 13 illustrates a force displacement curve (top) and a stiffness displacement curve (bottom) for a strain wave gear used in a robot arm.
Figure 14:
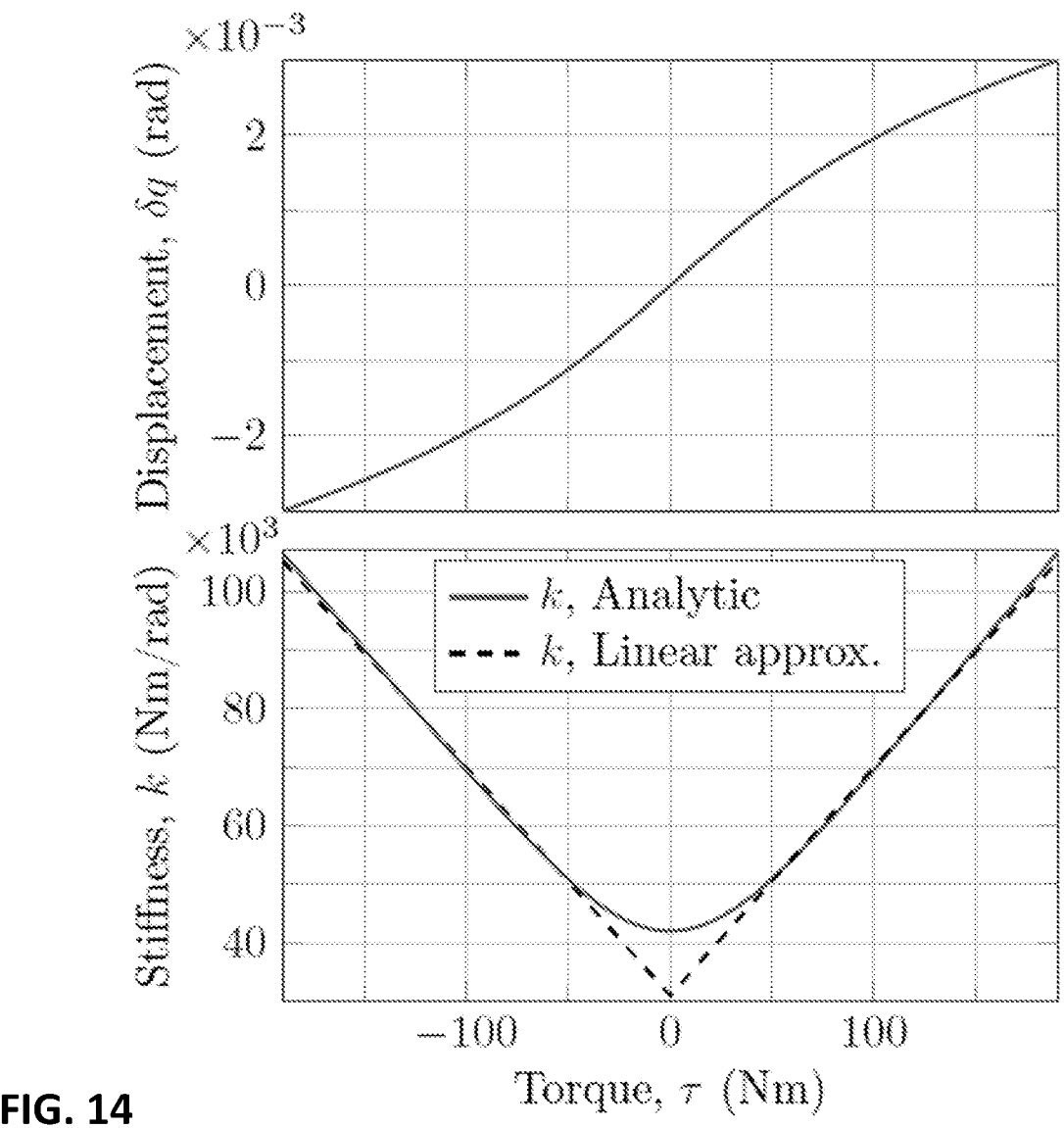
FIG. 14 illustrates a displacement force curve (top) and a stiffness torque curve (bottom) of a strain wave gear used in a robot arm.

A gear stiffening effect is expected to impact the system dynamics such as the vibrational properties of the robot arm. Some robot arms such as collaborative robot arms may be provided with strain wave gears, which have a significant impact on overall impedance of the system. The torque-displacement relationship of a strain-wave gear is usually approximated as a cubic polynomial like {ii.}{iii.}{iv.}{v.}

$$\tau \approx k_1 \delta q + k_3 \delta q^3$$ eq. 32 where $\tau$ is the joint torque, $\delta q$ is angular deformation, and where $k_1$ and $k_3$ are polynomial coefficients. FIG. 13 illustrates a torque-displacement curve for a strain wave gear used in the base joint of the collaborative robot named UR5e and provided by the company Universal Robots. The top graph illustrates the force displacement curve of the strain wave gear, adjusted according to {v.}. The bottom graph illustrates a stiffness displacement curve for the strain wave gear. It is noticed the figure only serve as an illustrating example. The figure is generated with $k_1 = 42.0$ Nm/(rad× $10^{-3}$)$^3$ and $k_3 = 2.4$ Nm/(rad×$10^{-3}$)$^3$, which produce a curve nearly identical to the results of {v.}. It is possible to describe the equivalent stiffness coefficient of the gear as:

$$k = \frac{\partial \tau}{\partial \delta q} \approx k_1 + 3k_3 6q^2, \qquad \text{eq. 33}$$

which is illustrated as the bottom graph of FIG. 13. However, it is not straight forward to use a description in terms of displacement to approximate stiffness, because gear deformation is not known from the configuration of the robot. Thus, it is desired to obtain a description in terms of torque instead, as torque is related to the configuration and mass moment of inertia. By isolating $\delta_q$ in eq. 32

$$\delta q = \frac{\sqrt[3]{\sqrt{3}\sqrt{4k_1^3 k_3^3 + 27k_3^4 \tau^2} + 9k_3^2 \tau}}{\sqrt[3]{2}\, 3^{2/3} k_3} - \frac{\sqrt[3]{\frac{2}{3}} k_1}{\sqrt[3]{\sqrt{3}\sqrt{4k_1^3 k_3^3 + 27k_3^4 \tau^2} + 9k_3^2 \tau}}, \qquad \text{eq. 34}$$

which is illustrated as the top graph of FIG. 14. Displacement force curve for strain wave gear in UR5e base joint (top). Then it is possible to replace $\delta q$ in eq. 33 with the expression in eq. 34 to obtain an expression for stiffness in terms of torque. The expression will become:

$$k \approx k_1 + 3k_3 k_3 \left( \frac{\frac{\sqrt[3]{\sqrt{3}\sqrt{4k_1^3 k_3^3 + 27k_3^4 \tau^2} + 9k_3^2 \tau}}{\sqrt[3]{2}\, 3^{2/3} k_3} - \frac{\sqrt[3]{\frac{2}{3}} k_1}{\sqrt[3]{\sqrt{3}\sqrt{4k_1^3 k_3^3 + 27k_3^4 \tau^2} + 9k_3^2 \tau}}}{} \right)^2, \qquad \text{eq. 35}$$

which is illustrated as the bottom graph of FIG. 14. From the illustration, it is visually determined, that it is acceptable to approximate eq. 35 as partially linear, i.e. as:

$$k \approx a + b|\tau|, \qquad \text{eq. 36}$$

where a and b are the coefficients of the symmetrical linear approximation of the stiffness, k. The linear approximation is illustrated by dashed lines in bottom graph of FIG. 14. It is seen from the rotational Newtons second law, that torque $\tau$ is directly $$\tau = J\ddot{q} \qquad \text{eq. 37}$$

$$|\tau| \propto J \qquad \text{eq. 38}$$

Therefore, under the assumption, that joint accelerations are equivalent for different configurations, it is determined, that the robot gear stiffness variations can be approximated as:

$$k \approx a + bJ \qquad \text{eq. 39}$$

The gravity load, i.e. the average load, should also be taken into account because this will put additional torque on the gear and thereby affect the local stiffness. It is chosen to approximate this contribution to be proportional to $|\tau_g|$, based on the stiffness curve in eq. 36 and in FIG. 14. Therefore, the mechanical stiffness is approximated as:

$$k \approx k_0 + k_J J + k_g |\tau_g| \qquad \text{eq. 40}$$

where $k_0$ is a constant coefficient $k_J$ is the inertia dependency coefficient, and $k_g$ is the gravity torque dependency coefficient. Together, these coefficients describe the stiffness variations of the strain wave gears.

The non-linear bending force-displacement relation of beams (like aluminum tube links of the robot) can also be approximated as cubic polynomial{vi.}{vii.}, similar to the strain wave gear. Thus, the stiffening effects of the links will also be captured by eq. 40 without any additional effort.

System Damping Variations

Friction estimation is in general a very complex branch of research, and friction in strain-wave gears is no different. The friction torque depends for example non-linearly on velocity, load torque, position, temperature, and history {ii.}{v.}{viii.}{ix.}. The linear ideal $2^{nd}$ order dynamic system $G_j(s)$ in eq. 19 has linear viscous damping. However, strain wave gears feature a multitude of friction components, of which several are non-linear, e.g. non-linear viscous friction and torque dependency {ix.}. It is assumed, that the friction torque can be approximated as:

$$\tau_{damping} = -c\dot{\delta}q \qquad \text{eq. 41}$$

$$= -\underbrace{(c_0 + c_1 \dot{\delta}q + c_2 \dot{\delta}q^2)(1 + c_\tau |\tau|)}_{c} \dot{\delta}q, \qquad \text{eq. 42}$$

where c is the linear damping coefficient, $\dot{\delta}q$ is the time-derivative of the gear deflection angle, i.e. the deflection velocity, $c_0$, $c_1$, and $c_2$ are the polynomial coefficients of non-linear viscous friction, and $c_\tau$ is the contribution from load dependency. It is seen, that the damping coefficient c varies with both deflection velocity and load torque.

Figure 15:
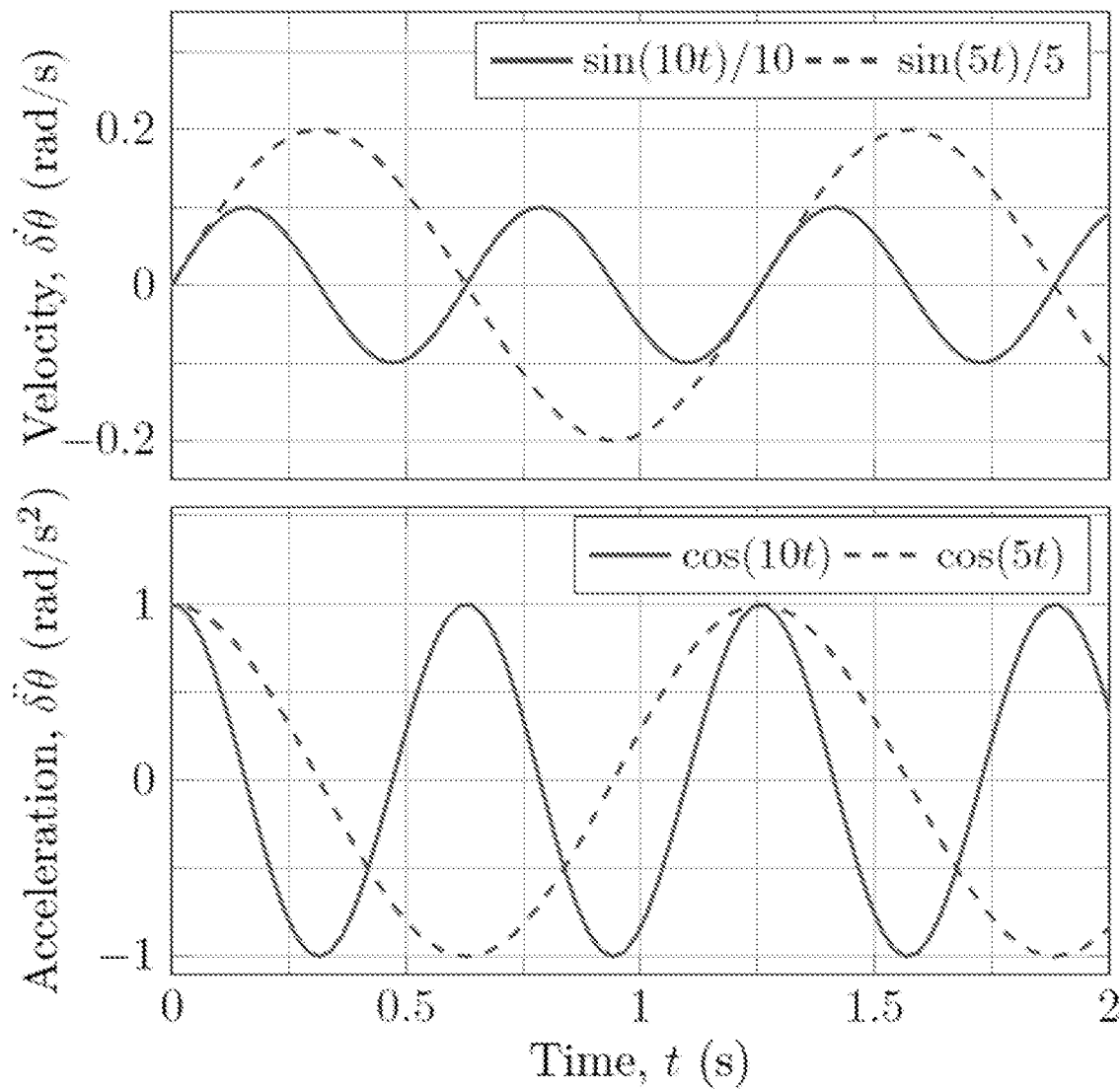
FIG. 15 illustrates velocity variations for constant acceleration amplitudes with varying frequency.

FIG. 15 illustrates how a reduced natural frequency will lead to increased deflection velocity amplitude $\dot{\delta}q_{amp}$. The figure illustrates how two oscillations with identical acceleration amplitudes, but different frequencies, will result in different velocity amplitude. It is found that $\dot{\delta}q_{amp}$ is inverse proportional to the frequency of oscillation, which means that a reduced frequency leads to higher velocities. It is also seen from eq. 29 that the natural frequency $\omega_n$ varies with the mass moment of inertia J such that:

$$\dot{\delta}q_{amp} \propto \frac{1}{\omega_n} = \frac{1}{\sqrt{1 + K_p} \sqrt{k/J}} \propto \sqrt{J} \qquad \text{eq. 43}$$

According to eq. 38 $|\tau|$ can be seen as proportional to J, whereby c can be rewritten from eq. 42 as:

$$c \approx (c_0 + c_1 \sqrt{J} + c_2 J)(1 + c_\tau J) \qquad \text{eq. 44}$$

such that damping variations can also be estimated from mass moment of inertia, J.

Closed Loop Controller Variations

It is expected that the robot controller has some adaptation of gains to ensure a good performance for varying configurations. In configurations with high inertia, a high proportional gain $K_p$ will lead to instability. Likewise, in configurations with low inertia, a low proportional gain will provide a poor performance. It is assumed, that robot controller adaption can be approximated this way as:

$$K_p \approx k_p / J \qquad \text{eq. 4}$$

where $k_p$ is a constant coefficient, which is scaled by the inverse of J to adjust the gains for varying configuration.

Inertia-Vibration Model

The inertia-vibration model can be described by inserting eq. 40, eq. 44 and eq. 45 into eq. 29 and eq. 31 as:

$$\omega_n \approx \sqrt{1+k_p/J}\sqrt{(k_0+k_JJ+k_g|\tau_g|)/J} \qquad \text{eq. 46}$$

$$\zeta \approx \sqrt{1+k_p/J}\frac{(c_0+c_1\sqrt{J}+c_2J)(1+c_\tau J)}{2\sqrt{(k_0+k_JJ+k_q|\tau_q|)J}}, \qquad \text{eq. 47}$$

where $J=J_0$ in the base map and $J=J_1$ in the shoulder map. Thus it is desired to fit the parameters $_0$, $k_J$, $k_g$, $k_p$, $c_0$, $c_1$, $c_2$ and $c_\tau$ for the base and shoulder joint respectively, to obtain a inertia-vibration model of the robot arm.

Once the vibrational properties and inertia of the robot arm of a plurality of different physical configurations have been obtained (in step 340) an inertia-vibration model can (in step 380) be obtained based on the obtained vibrational properties and inertia of the robot arm. In one embodiment the inertia-vibration model can be obtained by fitting the coefficients of the natural frequency and damping of the robot arm according to eq. 46 and eq. 47 to the obtained vibrational properties and inertia of the robot arm. The parameters can be obtained by using any parameter estimation methods such as "least squares methods" where the best solution is the solution, which results in the smallest sum of squared error. Suitable methods can for instance be The Gauss-Newton method, The Levenberg-Marquardt method, Powell's Dog Leg method, A secant version of the L-M method, A secant version of the Dog Leg method etc. and various commercially available software have implemented such fitting methods and makes it simple to implement and obtain the inertia-vibration mode.

The method according to the present invention have been validated in an experiment where an inertia-vibration model of a robot arm has been obtained. The experiment has been performed using a collaborative robot arm sold under the name UR5e and provided by the company Universal Robots A/S. The robot arm was mounted on a steel stand, which is considered very rigid in comparison with the robot arm. A payload was mounted on the tool flange and the payload was varied between 0, 1, 3, and 5 kg in the experiments. The Robot arm was controlled by a robot controller provided with the robot arm and data was logged by a laptop PC.

Generating Empirical Data

Two different algorithms were utilized in order to obtain the vibrational properties of the robot arm at a plurality of different physical configurations. Algorithm 1 ensures that the robot arm is arranged in a plurality of different physical configurations covering the workspace of the robot arm, and Algorithm 2 excites the dynamics of the robot arm by generation of random target motions around the base and shoulder joints and identifies the vibrational properties of the robot arm.

---

Algorithm 1 Dynamic mapping for robot arm for V=[0 π/4 ........ 3 π/4] do
   move tool flange to angle V
   for R=[0 0,4 + 1/24 ........ 0,9] do
      j = random [ 3   4   5]
      Orient joint j randomly
      Obtain vibrational properties (Algorithm 2)
   end for
end for

---

Figure 16:
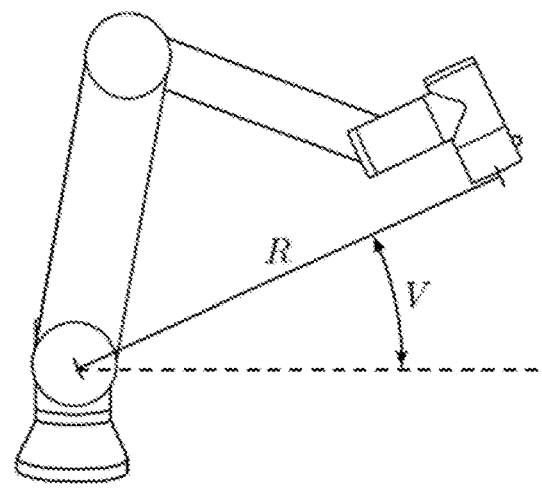
FIG. 16 illustrates physical configurations of a robot arm used during an experimental example.

In Algorithm 1 the robot arm places the center of the tool flange in an angle V as illustrated in FIG. 16. Then for each value of V, the tool flange is placed in different distances between shoulder axis and center of tool flange. Thereby, the whole workspace of the robot is covered. The mapping with Algorithm 1 is repeated for each payload (0 kg, 1 kg, 3 kg, 5 kg), and in each physical configuration, the robot arm dynamics are excited, and the vibrational properties are identified by Algorithm 2. This means, that the identification will be performed for 4 values of V, 13 values of R, and 4 values of payload, leading to 4×13×4=208 different configurations. In each configuration, Algorithm 2 will run for ~8.5 s for each direction (base and shoulder). With overhead for motion between physical configurations of around 2 s, and overhead for manual payload change of around 90 s, the complete mapping procedure takes ~208×(2×8.5+2)+4× 90=4312 s≈72 minutes.

---

Algorithm 2 Obtain vibrational properties for j=[0   1] do
   $q_{j0}$ = actual $q_j$
   Start data logging, t= 0s
   while t < 8s do
      $\partial q_j$= random (−π/18; π/18) rad
      $\dot{q}_j$= random (0,5; 2) rad/s
      $\ddot{q}_j$= random (0,3; 7) rad/s²
      moveJ($q_{j0}$+ $\partial q_j$; $\dot{q}_j$; $\ddot{q}_j$)
      Wait random (0,1; 1,0) s
   end while
   Stop data logging
   Fit transfer function $G_{local}$ (s)to dato
   Store $\omega_n$ and $\zeta$
end for

---

Figure 17:
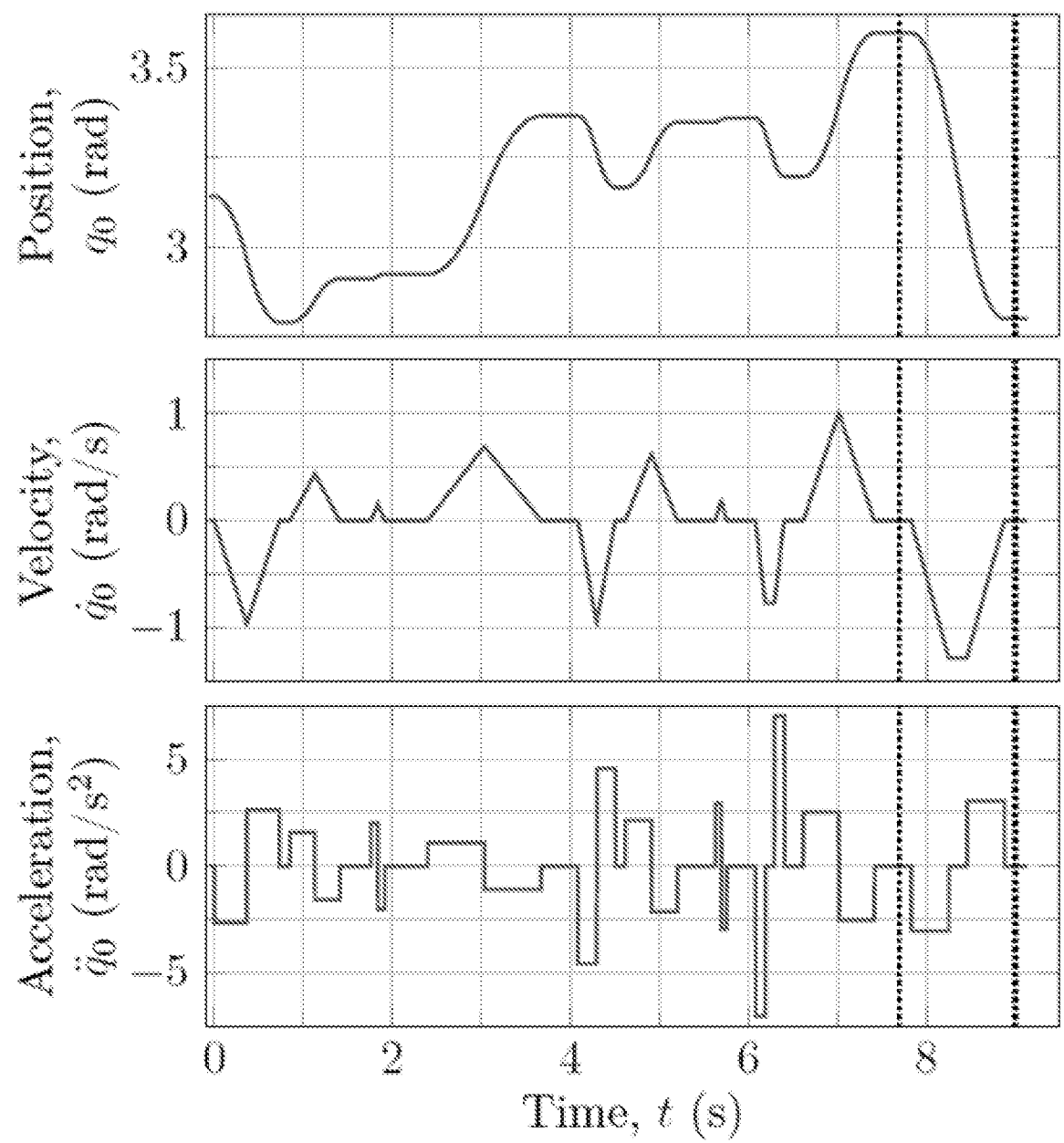
FIG. 17 illustrates an example of a random bang-coast-bang excitation reference signal used for exciting a robot arm.

In Algorithm 2, the dynamics around the base and shoulder joints, respectively, are excited by a sequence of random bang-coast-bang motions. Here a bang-coast-bang motion denotes a motion with constant joint accelerations, possibly followed by a period of constant joint velocity, finalizing with a constant deceleration {x.}. An example of excitation signal for the base joint is presented in FIG. 17. Here the dotted lines mark a single bang-coast-bang motion. Target motion, i.e. q, $\dot{q}$, and $\ddot{q}$, and accelerometer measurements are logged during the motion and utilized for identification by fitting the parameters of the transfer function in eq. 25.

Mapping Results

Once the vibrational properties of the robot arm of the plurality of different physical configurations were obtained the coefficients of eq. 46 and eq. 47 were based on the obtained vibrational properties of the robot arm. This process is performed for the base and shoulder, respectively. During data fitting process is realized, that influence from $c_1$ and $k_g$ were negligible. This was observed from very small numerical values and high solver uncertainty for these parameters. Thus, they have been neglected in the inertia-vibration model of the robot arm and eigenfrequency and damping can thus be mapped using:

$$\omega_n \approx \sqrt{1+k_p/J}\sqrt{(k_0+k_JJ)/J} \qquad \text{eq. 48}$$

$$\zeta \approx \sqrt{1+k_p/J}\frac{(c_0+c_2J)(1+c_\tau J)}{2\sqrt{(k_0+k_JJ)J}} \qquad \text{eq. 49}$$

Figure 18:
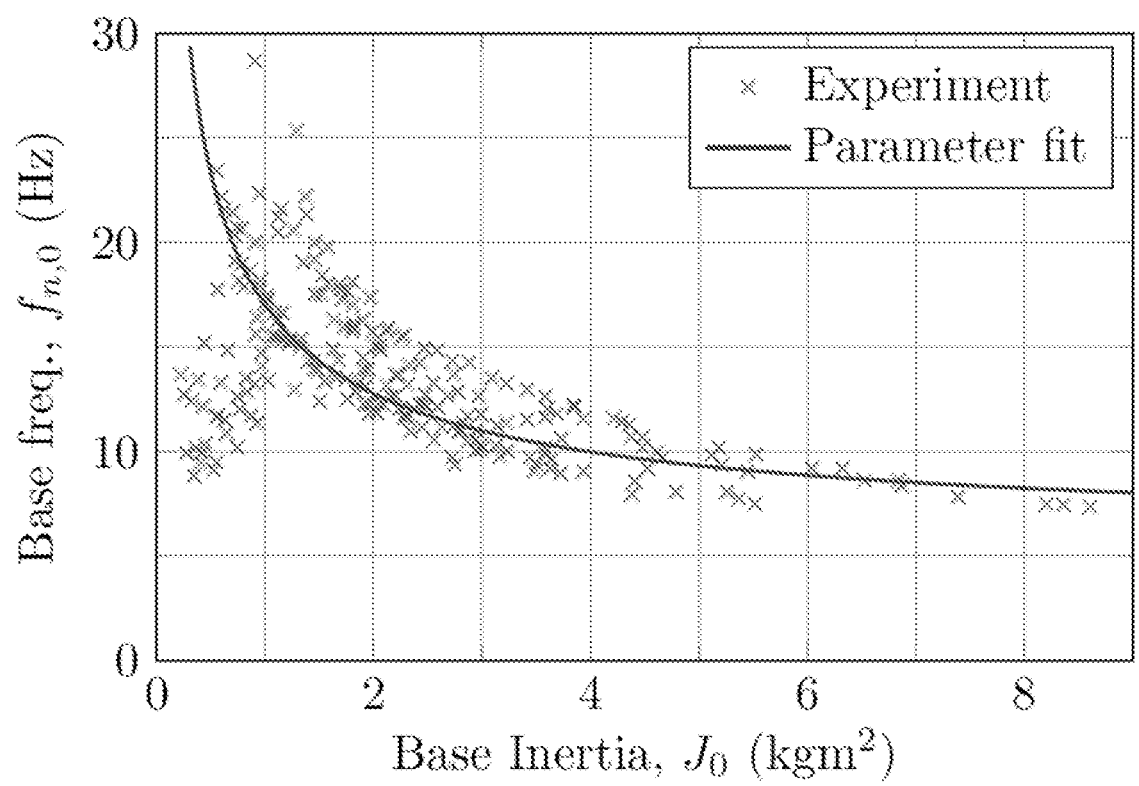
FIG. 18 illustrates base joint natural frequency experimental results fitted to base joint inertia.

First the natural frequency $\omega_{n,0}$ in relation to the base joint around were found by fitting the parameters of:

$$\omega_{n,0} \approx \sqrt{1+k_p/J_0}\sqrt{(k_0+k_JJ_0)/J_0} \qquad \text{eq. 50}$$

where index $\{\ \}_0$ refers to the base joint (joint 0). The expression is found by substituting J with $J_0$ in eq. 48. FIG. 18 illustrates a graph (illustrated by a solid line) of the natural frequency $f_n$ in Hz obtained by:

$$f_n = \frac{\omega_n}{2\pi} \quad \text{eq. 51}$$

and by fitting the parameters $k_0$, $k_J$, and $k_p$ of eq. 50 to the vibrational properties and inertia of different physical configurations of the robot arm illustrated by a cross. It can be seen that the correlation between fitted graph and the experiential data are not as good for inertias $J_0$ below approximately 1 kg m$^2$.

Figure 20:
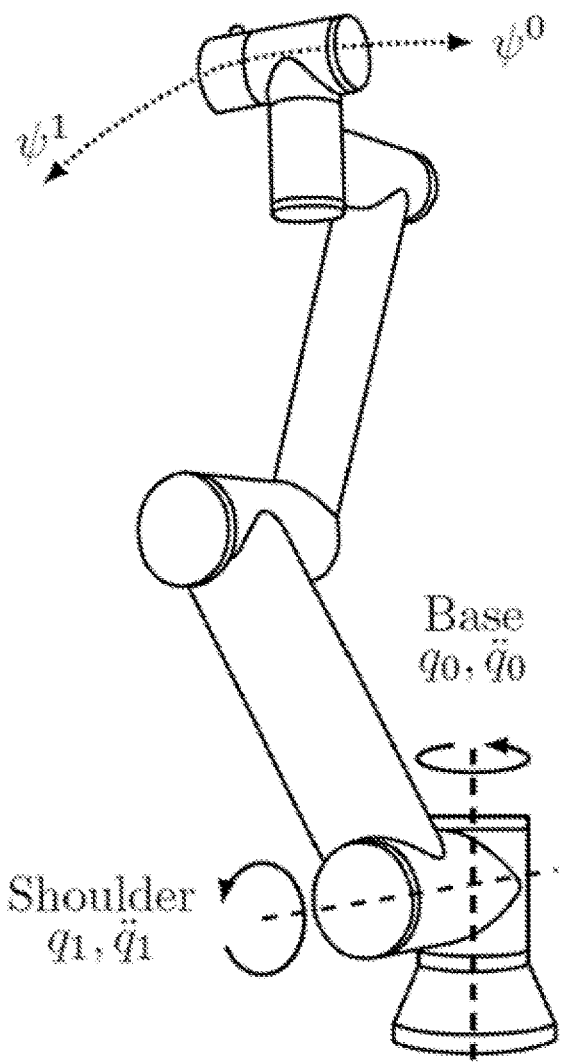
FIG. 20 illustrates a robot configuration with low base joint inertia and large shoulder joint inertia.
Figure 19:
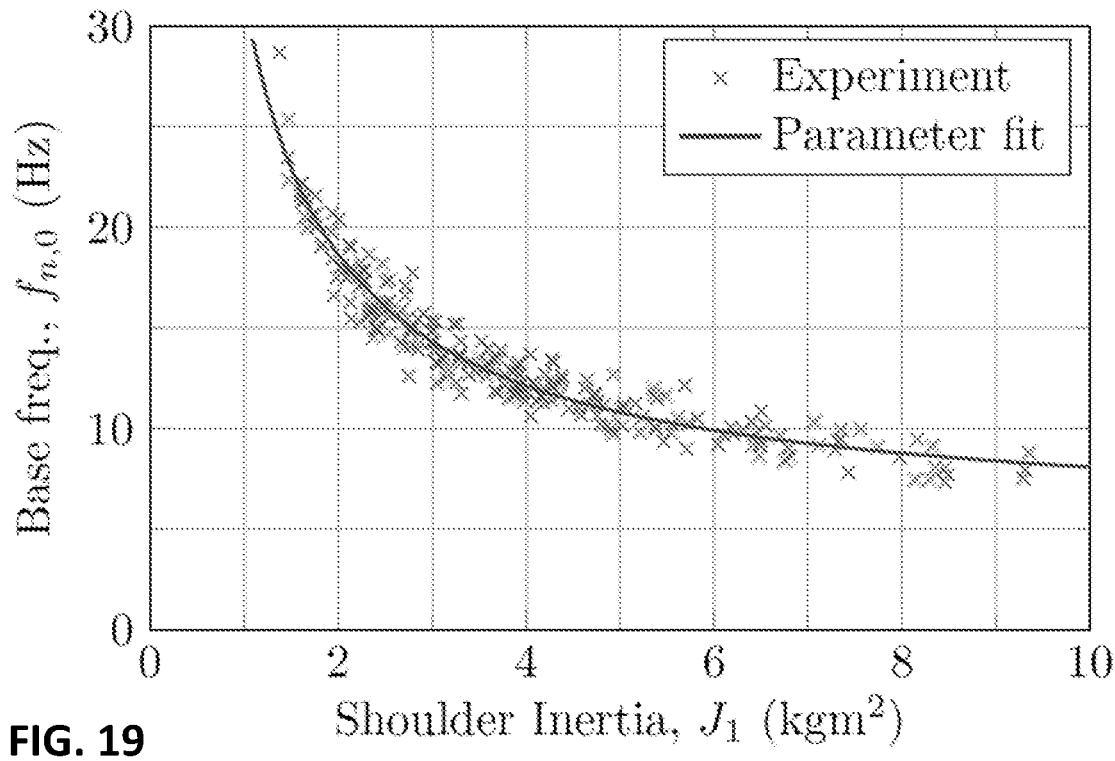
FIG. 19 illustrates base joint natural frequency experimental results fitted to shoulder joint inertia
Figure 21:
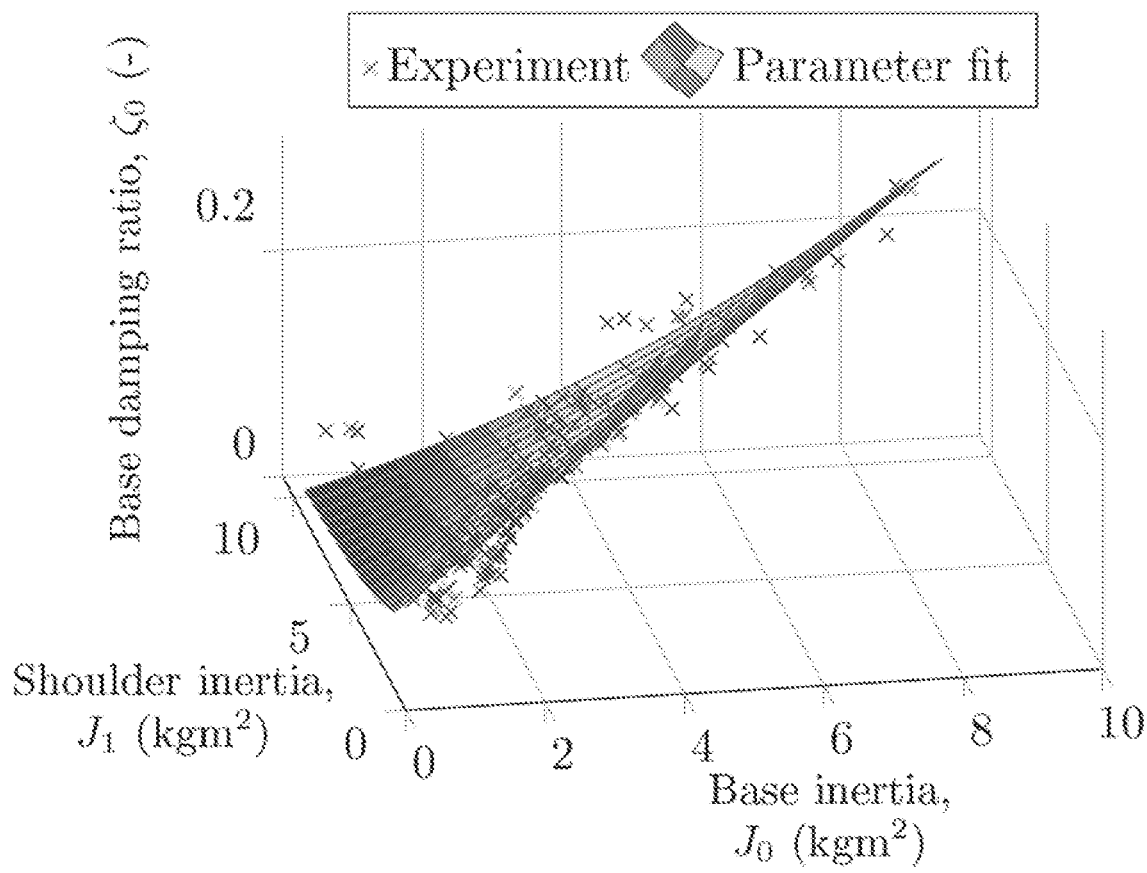
FIG. 21 illustrates base damping ratio fitted to shoulder inertia and base inertia.

A low inertia around the base joint, can be experienced, even though the robot is in a stretched configuration, with reference to the robot configuration in FIG. 20. An acceleration in the base joint or the shoulder joint will cause a robot tool flange acceleration in almost the same direction, i.e. $\psi^0$ and $\psi^1$ are nearly collinear, as illustrated in FIG. 20. Also, intuitively, a configuration like seen FIG. 20 will have a low natural frequency in any direction, including the direction around the base joint. Consequently, it can be assumed that the shoulder inertia could be a better predictor of the natural frequency around the base joint. Then, the coefficients of:

$$\omega_{n,0} \approx \sqrt{1+k_p/J_1}\sqrt{(k_0+k_JJ_1)/J_1} \quad \text{eq. 52}$$

were identified. In the identification process, it was found that the solution space is floating, due to overparameterization. The solution space is floating because $\omega_n$ is dependent on a ratio, which can be found be infinitely many combinations. Thus, $k_0$ is fixed at a value of 10000 Nm/rad to encounter the overparameterization, leaving $k_J$ and $k_p$ to be optimized. Then the damping ratio of vibration around the base joint is found by fitting:

$$\zeta_0 \approx \sqrt{1+k_p/J_0}\frac{(c_0+c_2J_0)(1+c_\tau J_0)}{2\sqrt{(k_0+k_JJ_1)J_1}\sqrt{1+k_p/J_1}} \quad \text{eq. 53}$$

to the data, where $k_0$, $k_J$, and $k_p$ are set to the values found in the frequency identification. The fitted coefficients of the inertia-vibration model in relation to the base joint as defined in eq. 52 and eq. 53 are listed in table 1. FIG. 19 illustrates the base joint natural frequency experimental results (indicated by the crosses) fitted to shoulder joint inertia, where the solid graph is provided based on eq. 52 with the coefficients of table 1. FIG. 21 illustrates the base damping ratio experimental results (indicated by crosses) fitted to shoulder inertia and base inertia, where the solid surface provided based on eq. 53 with the coefficients of table 1.

TABLE 1

The fitted coefficients of the inertia-vibration model in relation to the base joint

| Parameter | | Value | Unit |
|---|---|---|---|
| Stiffness | $k_0$ | 10000* | Nm/rad |
| Inertia coefficient | $k_J$ | 1060 | Nm/rad/(kg m$^2$) |
| Prop. gain coefficient. | $k_p$ | 2.54 | kg m$^2$ |

TABLE 1-continued

The fitted coefficients of the inertia-vibration model in relation to the base joint

| Parameter | | Value | Unit |
|---|---|---|---|
| Damping coefficient | $c_0$ | 1.53 | Nm s |
| Velocity coefficient | $c_2$ | 0.39 | Nm s/(kg m$^2$) |
| Torque coefficient | $c_\tau$ | 3.81 | (kg m$^2$)$^{-1}$ |

*Fixed value of $k_0$ to avoid overparameterization

Shoulder Dynamic Map

A similar identification procedure for the coefficients of the inertia-vibration model of the shoulder joint is performed. Consequently, the natural frequency and damping ratio in relation to the shoulder joint is fitted to:

$$\omega_{n,1} \approx \sqrt{1+k_p/J_1}\sqrt{(k_0+k_JJ_1)/J_1} \quad \text{eq. 54}$$

$$\zeta_1 \approx \sqrt{1+k_p/J_1}\frac{(c_0+c_2J_1)(1+c_\tau J_1)}{2\sqrt{(k_0+k_JJ_1)J_1}} \quad \text{eq. 55}$$

Figure 22:
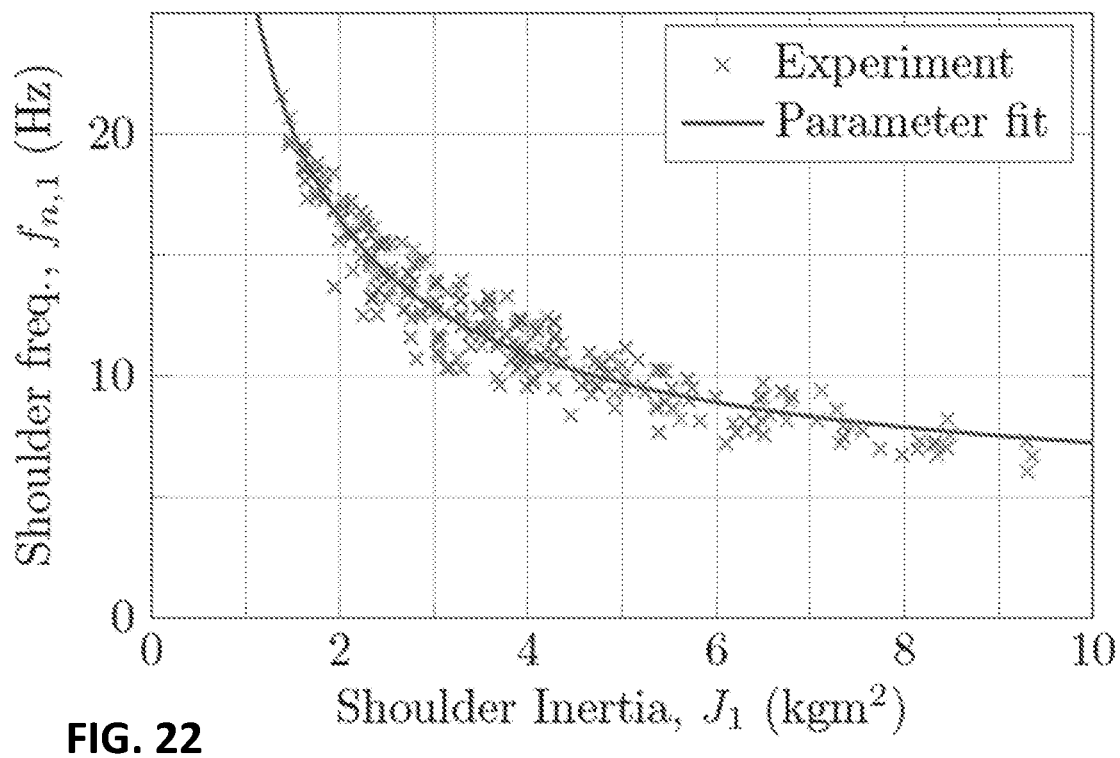
FIG. 22 illustrates shoulder joint natural frequency fitted to shoulder inertia.
Figure 23:
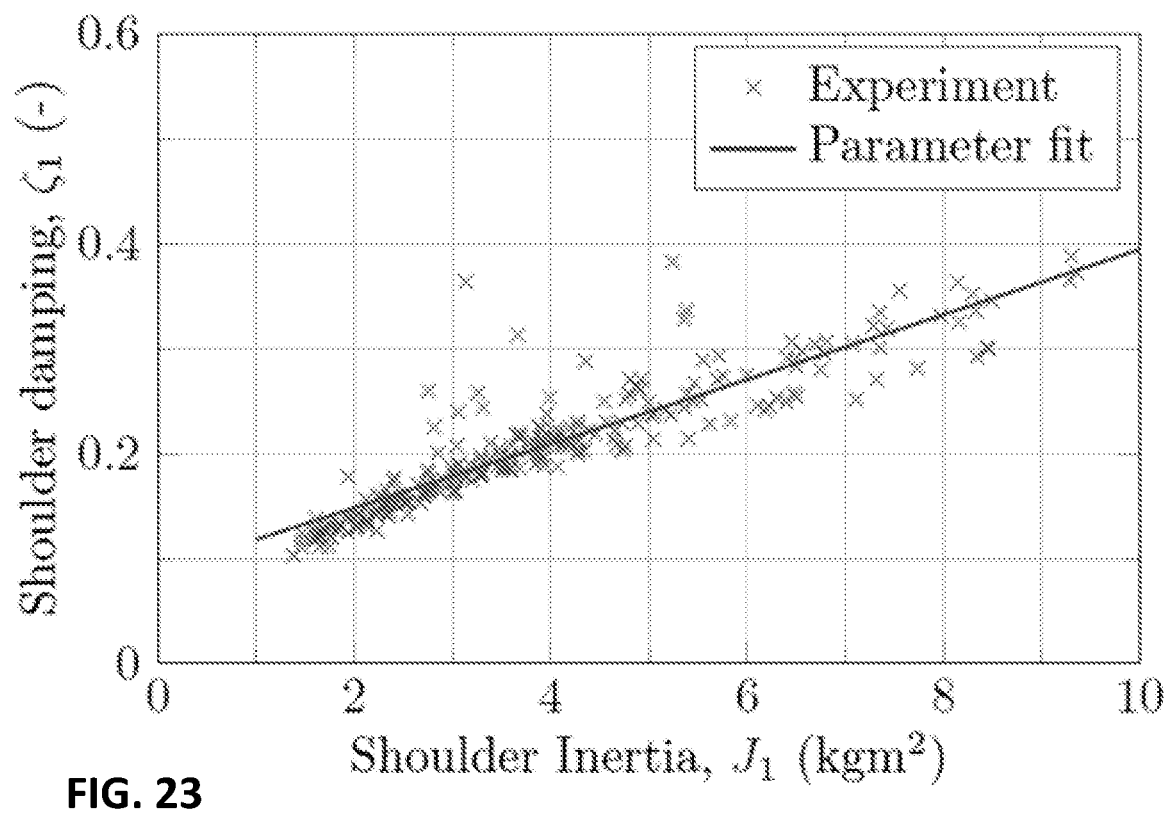
FIG. 23 illustrates shoulder joint damping ratio fitted to shoulder joint inertia.

The fitted coefficients of the inertia-vibration model in relation to the shoulder joint as defined in of eq. 54 and eq. 55 are listed in table 2. FIG. 22 illustrates the shoulder joint natural frequency experimental results (indicated by the crosses) fitted to shoulder joint inertia, where the solid graph is provided based on eq. 54 with the coefficients of table 2. FIG. 23 illustrates the shoulder damping ratio experimental results (indicated by crosses) fitted to shoulder inertia, where the solid graph is provided based on eq. 55 with the coefficients of table 2.

TABLE 2

The fitted coefficients of the inertia-vibration model in relation to the shoulder joint

| Parameter | | Value | Unit |
|---|---|---|---|
| Stiffness | $k_0$ | 10000* | Nm/rad |
| Inertia coefficient | $k_J$ | 763 | Nm/rad/(kg m$^2$) |
| Prop. gain coefficient. | $k_p$ | 1.73 | kg m$^2$ |
| Damping coefficient | $c_0$ | 0.27 | Nm s |
| Velocity coefficient | $c_2$ | 0.038 | Nm s/(kg m$^2$) |
| Torque coefficient | $c_\tau$ | 47.2 | (kg m$^2$)$^{-1}$ |

*Fixed value of $k_0$ to avoid overparameterization

Figure 24:
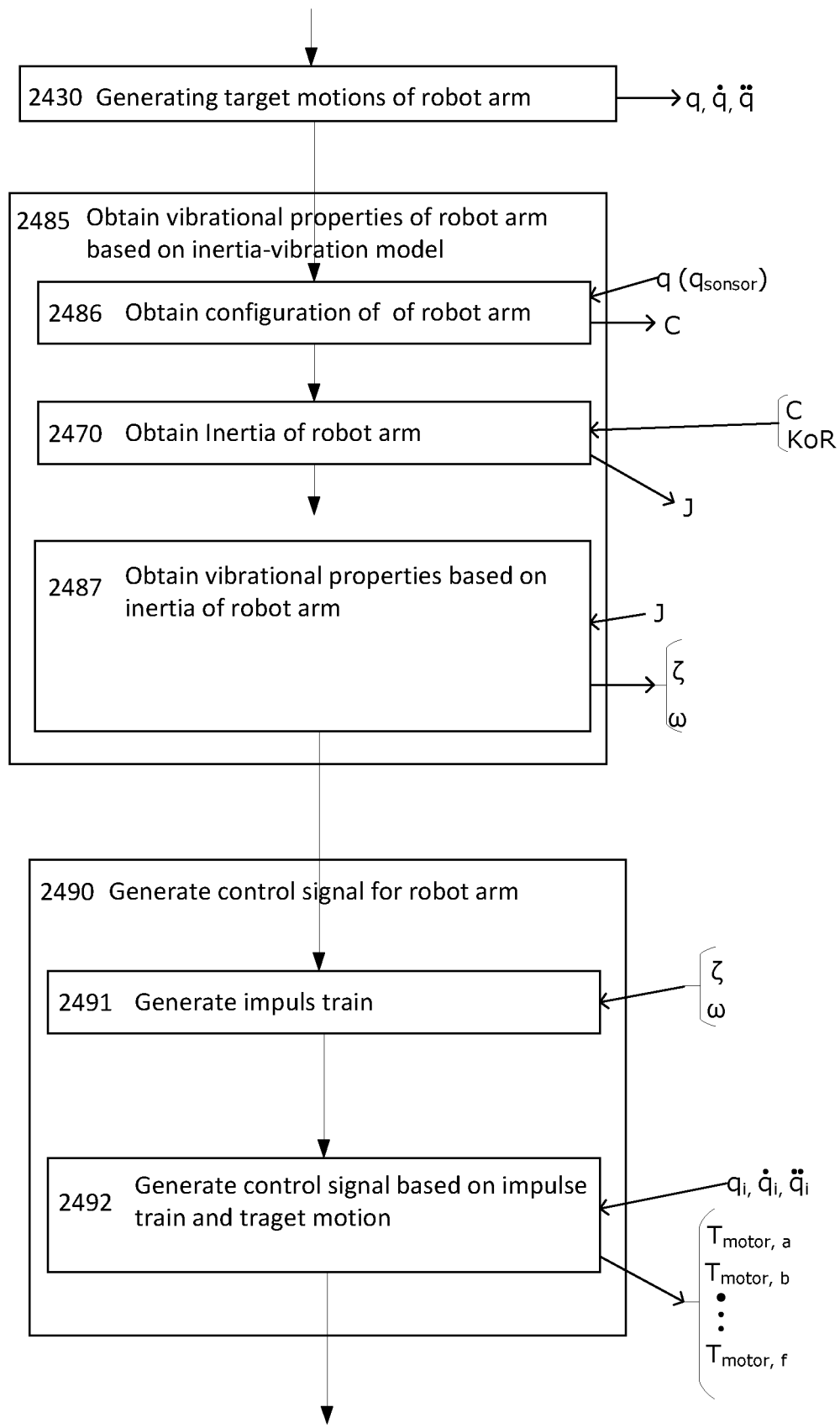
FIG. 24 illustrates a flow diagram of a method of controlling a robot arm based on an inertia-vibration model.

The inertia-vibration model can be used to control the robot arm and thereby take the vibrational properties of the robot arm into account when controlling the robot arm, hereby it is possible to reduce vibrations of the robot arm. FIG. 24 illustrates a method of controlling a robot arm for instance like the robot arm illustrated and described in connection with FIGS. 1 and 2. The method comprise a step 2430 of generating a target motion for the robot arm, a step 2485 of obtaining the vibrational properties of the robot arm based on an inertia-vibration model and a step 2490 of generating a control signal for the robot arm.

Step 2430 of generating a target motion for the robot arm can be performed as known in the art of robot arm control where a desired motion of the robot arm are provided or programmed by a user; for instance, a user may manually instruct the robot arm to move to a certain space and/or may program the robot arm to perform certain movements and the robot controller can then execute the robot program whereby the robot arm performs the desired movements. The target motion can be indicated as the position of a part of the robot arm in relation to a reference point for instance in form of the position of the robot tool flange in relation to the base joints. Also, the target motion can be indicated as a desired position of the robot joints for instance in form at the angular position of the robot joints and their derivatives. For instance, q denotes target position, q̇ denotes target velocity, q̈ denotes target acceleration.

Step 2485 of obtaining the vibrational properties of the robot arm is performed based on an inertia-vibration model relating to the robot arm, where the inertia-vibration model defines a relationship between the inertia of the robot arm and the vibrational properties of the robot arm. In the illustrated embodiment step 2485 of obtaining the vibrational properties of the robot arm comprises a step 2470 of obtaining the inertia J of the robot arm based on the physical configuration of the robot arm. The inertia of the robot arm can be obtained based on the physical configuration of the robot arm and a kinematic model KoR of the robot arm. For instance, the inertia of the robot arm may be obtained based on the physical configuration of the robot arm and the kinematic model of the robot arm, KoR, where the physical configurations of the robot arm is used as an input to the kinematic model of the robot arm.

The physical configuration of the robot arm can be obtained in step 2486 of obtaining the physical configuration of the robot arm. The physical configuration of the robot arm can be obtain based on the target positions q of the robot joints. Additionally, or alternatively the physical configuration can be obtained based on one or more joint sensors providing a sensor signal 220a, 220b, 220f indicating a joint sensor parameter $J_{sensor,a}$, $J_{sensor,b}$, $J_{sensor,f}$. For instance, the joint sensor may be an encoder indicating the position of the output flange in relation to the robot joint body of the robot joints.

In step 2487 the vibrational properties of the robot arm are obtained based on the inertia J of the robot arm and the inertia-vibration model of the robot arm. This can for instance be performed by using eq. 46 and eq. 47 whereby the eigenfrequencies $\omega_n$ and damping $\zeta$ of the robot arm can be obtained.

In step 2490 one or more control signals are generated for the robot arm. The control signal can be any signal capable of controlling the joint motors of the robot arm, for instance in form of motor control signals 223a, 223b, 223f indicative of the motor torque $T_{motor,a}$, $T_{motor,b}$, and $T_{motor,f}$ that the joint motors shall provide. The control signals are generated based on the target motion q, q̇, q̈ and the vibrational properties $\omega_n$, $\zeta$ of the robot arm. The control signals may for instance be generated by utilizing the so-called input shaping technique as referred to in the background of the invention. However, it is noted that other techniques for generating the control signals based on the target motion and the vibrational properties of the robot arm can be utilized, for instance the vibrational properties obtained via the inertia-vibration model of the robot arm may be incorporated in the dynamic model of the robot arm, which is used to generate the control signals. The vibrational properties obtained via the inertia-vibration model can also be used to adjust the smoothness of the target motion, e.g. the jerk or snap (third and fourth derivative of position).

In the illustrated embodiment step 2490 of generating the control signals comprises a step 2491 of provide an impulse train based on the vibrational properties of the robot arm, the impulse train comprises a number of impulses and step 2492 of generating the control signal based the target motion and the impulse train.

The impulse train comprises a number of impulses, having impulse magnitude and an associated impulse delay can for instance be provided using any methods of generating impulse trains used for input shaping for instance as presented disclosed in WO2019012040 and {xi.}{xii.}

Step 2492 can be performed by obtain an input signal for the robot arm based on the target motion and the dynamic model of the robot arm as known in the art of robot arm control. The input signal can then be convoluted with the impulse train resulting in the control signal, for instance as disclosed in WO2019012040 and {xi.}{xii.}.

As an example, the method of controlling a robot arm based on an inertia-vibration model obtained according the present invention have been implemented in a the UR5e robot arm of which the inertia-vibration model have been obtained as described in paragraphs [0080]-[0087]. The UR5e was provided with a control algorithm based on impulse shaping as described in in WO2019012040 and {xi.}{xii.}, where the vibrational-properties of the robot arm used for generating the impulse train were obtained based on the inertia-vibration model obtained in paragraphs [0080]-[0087].

The effect of the control algorithm was tested according to the test procedure presented in {xi.}. The test motions move the robot arm with a 5 kg payload between test configurations $Q_1$, $Q_2$, and $Q_3$ with joint space linear motions and the parameters of the test configurations of $Q_1$, $Q_2$, and $Q_3$ are listed in table 3.

TABLE 3

Parameters of test configurations $Q_1$, $Q_2$, and $Q_3$

| Parameter | | $Q_1$ | $Q_2$ | $Q_3$ | Unit |
|---|---|---|---|---|---|
| Base joint angle | $q_0$ | 0 | $\pi/2$ | $\pi/2$ | rad |
| Shoulder joint angle | $q_1$ | $-\pi$ | $-\pi$ | $-\pi/2$ | rad |
| Elbow joint angle | $q_2$ | 0 | 0 | $5\pi/6$ | rad |
| First wrist joint angle | $q_3$ | $-\pi/2$ | $-\pi/2$ | $-\pi/2$ | rad |
| Second wrist joint angle | $q_4$ | 0 | 0 | 0 | rad |
| Tool flange joint angle | $q_5$ | 0 | 0 | 0 | rad |
| Inertia in relation to base joint | $J_0$ | 9.73 | 9.73 | 1.12 | kg m² |
| Inertia in relation to shoulder joint | $J_1$ | 9.25 | 9.25 | 1.58 | kg m² |
| Eigenfrequency in relation to base joint | $f_{d,0}$ | 8.01 | 8.01 | 22.0 | Hz |
| Damping in relation to base joint | $\zeta_0$ | 0.27 | 0.27 | 0.08 | — |
| Eigenfrequency in relation to shoulder joint | $f_{d,1}$ | 6.91 | 6.91 | 19.2 | Hz |
| Damping in relation to shoulder joint | $\zeta_1$ | 0.37 | 0.37 | 0.14 | — |

Figure 25:
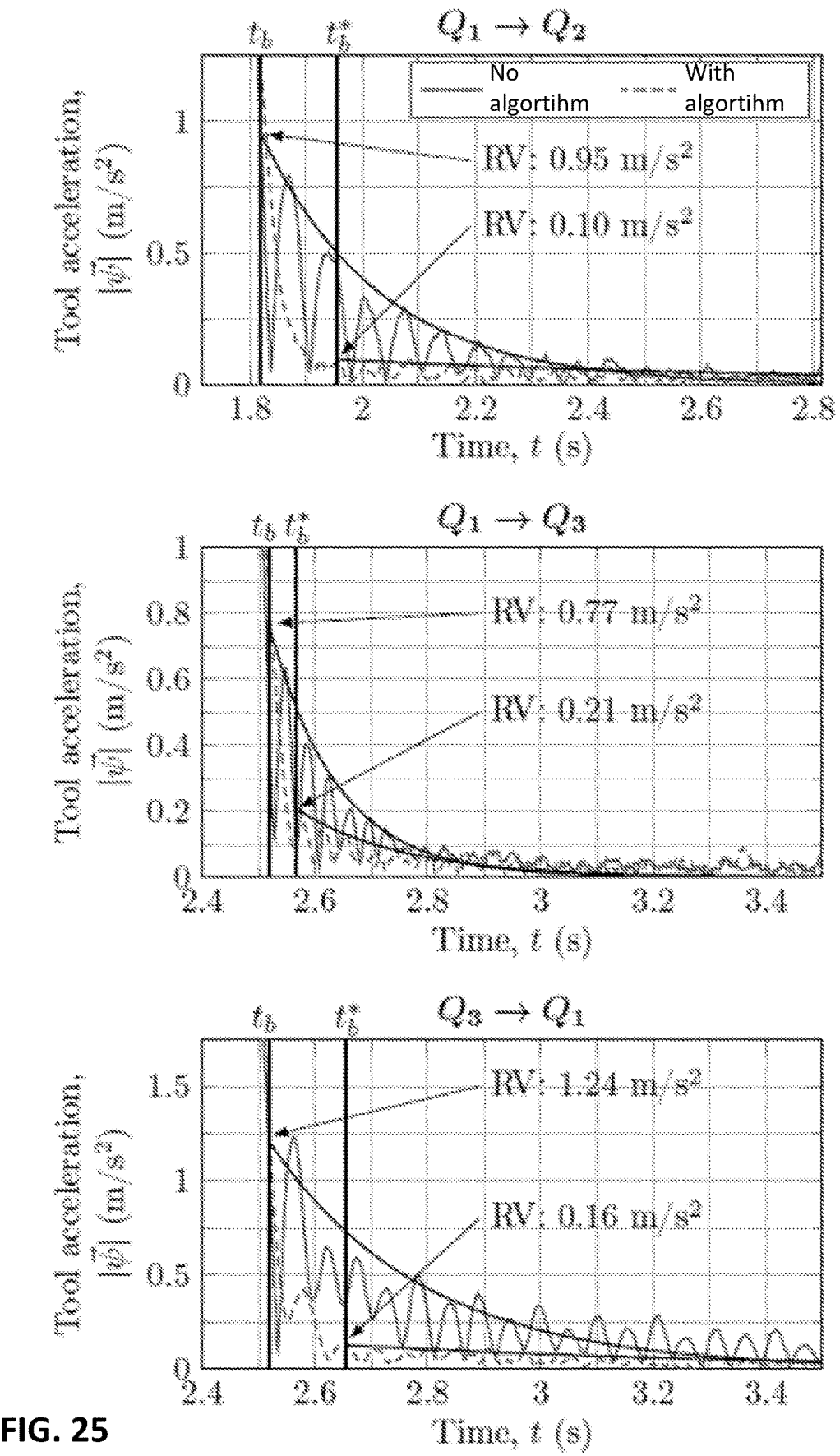
FIG. 25 illustrates tool acceleration of a robot arm while moving a robot arm from test configuration $Q_1$ to test configuration $Q_2$ (top); from test configuration $Q_1$ to test configuration Q3 (middle) and from test configuration $Q_3$ to test configuration $Q_1$ (bottom).

The robot arm was instructed to move from test configuration $Q_1$ to test configuration $Q_2$, from test configuration $Q_1$ to test configuration $Q_3$, and from test configuration $Q_3$ to test configuration $Q_1$. The movement were performed with and without utilizing the control algorithm according to the present invention and the vibrations of the robot tool flange were measured during the movement using the built-in accelerometer in the robot tool flange. FIG. 25 illustrates tool acceleration as a function of time where the solid line illustrates the tool acceleration during movement without the control algorithm and the dotted line illustrates the tool acceleration with the control algorithm. The top graph illustrates the tool accelerations while moving from test configuration $Q_1$ to test configuration $Q_2$; the middle graph illustrates the tool acceleration while moving from test configuration $Q_1$ to test configuration $Q_3$; and the bottom graph illustrates the tool acceleration while moving from from test configuration $Q_3$ to test configuration $Q_1$. The amount of Residual Vibration (RV) is quantified by extrapolating the logarithmic decay of peak accelerations back to the stop time of the motion, which is $t_b$ for the unshaped motion and $t_b^*$ for the shaped motion. The difference between $t_b$ and $t_b^*$ is the filter delay. The experiments were repeated 10 times, and the summarized results of delay and Residual Vibration (RV) are presented in table 4.

From both FIG. 25 and the results in table 4 it is clear to see, that the proposed methods in combination can reduce the amount of residual vibration in the UR5e robot. Starting with a visual impression of the accelerometer readings in FIG. 25 it is seen that the shaped motion has a noticeable delay. However, it is also immediately noticed, that vibrations can be reduced so much, that the resulting level of vibration will be lower. In fact, it seems that the vibrations are reduced to the present level of noise in the application. Thus, it can be concluded, that low frequency mechanical vibrations can be practically suppressed by the methods according to the present invention.

The amount of residual vibration listed in table 4 confirms, that this is the case for the 10 repetitions of the tested motions. The $Q_3 \rightarrow Q_1$ motion, i.e. motion towards higher frequencies, shows a vibration reduction around 75%. It is seen, that motions $Q_1 \rightarrow Q_2$ and $Q_1 \rightarrow Q_3$, i.e. low frequency end configuration, have a reduced level of vibration by ~90%.

TABLE 4

Performance of control algorithm, average of 10

|  | Delay (ms) | Residual vibrations (m/s$^2$) |
| --- | --- | --- |
| $Q_1 \rightarrow Q_2$ | | |
| No algorithm | 0 | 0.99 |
| With algorithm | 137 | 0.09 |
| Impact | | −89.5% |
| $Q_1 \rightarrow Q_3$ | | |
| No algorithm | 0 | 0.77 |
| With algorithm | 49 | 0.20 |
| Impact | | −73.6% |
| $Q_3 \rightarrow Q_1$ | | |
| No algorithm | 0 | 1.24 |
| With algorithm | 137 | 0.12 |
| Impact | | −90.3% |

The employed method introduces a time-delay in the reference motion, as listed in table 4. Generally, time-delay is not desired in industrial robots, because it decreases productivity. However, it depends on the actual task of the robot. As seen from FIG. 25 there is a significant time-delay for all motions, but the robot end-effector comes to a physical standstill at an earlier point in time. Thus, the time-delay pays of, and effectively increases the robot productivity.

The invention claimed is:

1. A method of obtaining vibrational properties comprised of a natural frequency and damping ratio of a robot arm, where the robot arm comprises robot joints connecting a base and a tool flange, where at least one robot joint comprises an output flange that is movable in relation to a body of the at least one robot joint and a motor that is configured to move the output flange in relation to the body; and where the method comprises:
setting the robot arm in different physical configurations;
for each of the physical configurations of the robot arm, obtaining the vibrational properties of the robot arm in relation to the at least one robot joint;
for each of the physical configurations of the robot arm, obtaining an inertia of the robot arm in relation to the at least one robot joint; and
obtaining an inertia-vibration model for the robot arm, wherein the inertia-vibration model defines the vibrational properties of the robot arm as a function of the inertia of the robot arm, where the inertia-vibration model is based on the vibrational properties of the robot arm obtained for the different physical configurations.

2. The method of claim 1 wherein for each of the physical configurations, obtaining the vibrational properties of the robot arm relation to the at least one robot joint comprises:
exciting vibrations of the robot arm by applying a force or torque to the robot arm;
upon exciting the vibrations of the robot arm, obtaining at least one motion parameter of at least a part of the robot arm; and
obtaining the vibrational properties of the robot arm in relation to the at least one robot joint based on the force or the torque and the at least one motion parameter.

3. The method of claim 2, wherein exciting vibrations of the robot arm comprises vibrating the robot arm in relation to a first axis by activating the motor of the at least one robot joint; and
wherein obtaining the at least one motion parameter comprises obtaining an acceleration of the at least part of the robot arm.

4. The method of claim 3, wherein the acceleration of the at least part of the robot arm is obtained using an accelerometer arranged at the at least part of the robot arm.

5. The method of claim 1, wherein for each of the physical configurations of the robot arm, obtaining the vibrational properties of the robot arm in relation to the at least one robot joint comprises:
exciting vibrations of the robot arm by activating the motor of the at least one robot joint;
upon exciting the vibrations of the robot arm, obtaining at least one motion parameter of at least a part of the robot arm; and
obtaining the vibrational properties of the robot arm in relation to the at least one robot joint based on activation of the motor of the at least one robot joint and the at least one motion parameter.

6. The method of claim 1, wherein the inertia of the robot arm in relation to the at least one robot joint is obtained based on a physical configuration of the robot arm and a kinematic model of the robot arm.

7. The method of claim 1, wherein the at least one robot joint comprises a first robot joint and a second robot joint;
wherein obtaining the vibrational properties of the robot arm in relation to the at least one robot joint comprises:
obtaining vibrational properties of the robot arm in relation to the first robot joint; and
obtaining vibrational properties of the robot arm in relation to the second robot joint;
wherein obtaining the inertia of the robot arm in relation to the at least one robot joint comprises:
obtaining an inertia of the robot arm in relation to the first robot joint; and
obtaining an inertia of the robot arm in relation to the second robot joint; and
wherein the inertia-vibration model is based on the vibrational properties of the robot arm obtained in relation to the first robot joint, the vibrational properties of the robot arm obtained in relation to the second robot joint, the inertia of the robot arm obtained in relation to the first robot joint, and the inertia of the robot arm obtained in relation to the second robot joint.

8. The method of claim 7, wherein:
the vibrational properties of the robot arm in relation to the first robot joint are obtained in relation to an axis of movement of the first robot joint;
the vibrational properties of the robot arm in relation to the second robot joint are obtained in relation to an axis of movement of the second robot joint;
the inertia of the robot arm in relation to the first robot joint is obtained in relation to the axis of movement of the first robot joint; and
the inertia of the robot arm in relation to the second robot joint is obtained in relation to the axis of movement of the second robot joint.

9. The method of claim 8, wherein the axis of movement of the first robot joint and the axis of movement of the second robot joint are non-parallel.

10. The method of claim 8, wherein the axis of movement of the first robot joint and the axis of movement of the second axis of the second robot joint are perpendicular.

11. The method of claim 7, wherein the first robot joint and the second robot joint are closer to the base than all other robot joints on the robot arm.

12. The method of claim 1, wherein the at least one robot joint comprises a robot joint that is closer to the base than all other robot joints on the robot arm.

13. The method of claim 1, wherein the vibrational properties of the robot arm obtained in relation to the at least one robot joint comprise eigenfrequencies for the robot arm in relation to the at least one robot joint and the damping ratio of the robot arm in relation to the at least one robot joint.

14. The method of claim 1, wherein the inertia-vibrational model comprises a $2^{nd}$ order transfer function.

15. The method of claim 1, wherein setting the robot arm in the different physical configurations comprises at least one of the following:
arranging the robot arm in different poses; or
providing different payloads to at least a part of the robot arm.

16. A controller configured to perform the method of claim 1 to control the robot arm, where the controller is configured to obtain the inertia-vibration model.

17. The method of claim 1, further comprising:
controlling the robot arm using input shaping, wherein impulses used to shape an input signal to the motor are generated based on vibrational properties obtained based on the inertia-vibration model.

18. The method of claim 17, wherein the obtained vibrational properties of the robot arm comprise eigenfrequencies for the robot arm in relation to the at least one robot joint and the damping ratio of the robot arm.

19. The method of claim 1, wherein the inertia-vibrational model is a $2^{nd}$ order transfer function that estimates the vibrational properties of the robot arm as a function of the inertia of the robot arm.

20. A method of controlling a robot arm, where the robot arm comprises robot joints connecting a base and a tool flange, where each of the robot joints comprises an output flange that is movable in relation to a body of a corresponding robot joint and a motor configured to move the output flange in relation to the body, and where the method comprises:
generating a target motion for the robot arm;
obtaining vibrational properties comprised of a natural frequency and damping ratio of the robot arm;
generating a control signal for the robot arm based on the target motion and the vibrational properties, the control signal comprising control parameters for motors of the robot joints; and
controlling the motors based on the control signal;
wherein the vibrational properties of the robot arm are obtained based on an inertia-vibration model for the robot arm, wherein the inertia-vibration model defines the vibrational properties of the robot arm as a function of an inertia of the robot arm, and wherein the inertia-vibration model is based on vibrational properties of the robot arm obtained for different physical configurations of the robot arm.

21. The method of claim 20, wherein generating the control signal comprises:
providing an impulse train based on the vibrational properties of the robot arm, the impulse train comprising impulses; and
generating the control signal based on the target motion and the impulse train.

22. The method of claim 20, wherein obtaining the vibrational properties of the robot arm comprises:
obtaining a physical configuration of the robot arm;
obtaining the inertia of the robot arm in relation to at least one of the robot joints based on the physical configuration of the robot arm and a kinematic model of the robot arm; and
obtaining the vibrational properties based on the inertia of the robot arm and the inertia-vibration model.

23. The method of claim 22, wherein the physical configuration of the robot arm is obtained based on encoder signals indicating a position of an output flange on the robot arm in relation to a body of a robot joint associated with the output flange.

24. The method of claim 22, wherein the physical configuration of the robot arm is obtained based on target positions of the robot joints.

25. The method of claim 20, further comprising obtaining the inertia-vibration model by performing operations comprising
setting the robot arm in the different physical configurations;
for each of the physical configurations of the robot arm, obtaining vibrational properties of the robot arm in relation to at least one robot joint; and
for each of the physical configurations of the robot arm, obtaining an inertia of the robot arm in relation to the at least one robot joint.

26. A controller for controlling a robot arm according to the method of claim 20.

27. A robot controller for controlling a robot arm, wherein the robot arm comprises a plurality of robot joints connecting a robot base and a robot tool flange, wherein each of the robot joints comprises:
an output flange movable in relation to a robot joint body; and
a joint motor configured to move the output flange in relation to the robot joint body;
wherein the robot controller is configured to control the robot arm based on an inertia-vibration model of the robot by executing operations comprising:
generating a target motion for the robot arm;
obtaining vibrational properties comprised of a natural frequency and damping ratio of the robot arm;
generating a control signal for the robot arm based on the target motion and the vibrational properties, the control signal comprising control parameters for motors of the robot joints; and controlling the motors based on the control signal;

wherein the vibrational properties of the robot arm are obtained based on an inertia-vibration model relating to the robot arm, wherein the inertia-vibration model defines the vibrational properties of the robot arm as a function of the inertia of the robot arm, and wherein the inertia-vibration model is based on the vibrational properties of the robot arm obtained for different physical configurations of the robot arm.

* * * * *